(12) United States Patent
Sundararaman et al.

(10) Patent No.: US 9,499,752 B2
(45) Date of Patent: Nov. 22, 2016

(54) SLURRY HYDROCONVERSION WITH HIGH ACTIVITY CATALYSTS

(71) Applicants: Ramanathan Sundararaman, Frederick, MD (US); Thomas Francis Degnan, Jr., Philadelphia, PA (US); Rustom Merwan Billimoria, Hellertown, PA (US); Keith Wilson, Weybridge (GB); Randolph J. Smiley, Hellertown, PA (US); Jacob Johannes Thiart, Baton Rouge, LA (US)

(72) Inventors: Ramanathan Sundararaman, Frederick, MD (US); Thomas Francis Degnan, Jr., Philadelphia, PA (US); Rustom Merwan Billimoria, Hellertown, PA (US); Keith Wilson, Weybridge (GB); Randolph J. Smiley, Hellertown, PA (US); Jacob Johannes Thiart, Baton Rouge, LA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 255 days.

(21) Appl. No.: 14/309,002

(22) Filed: Jun. 19, 2014

(65) Prior Publication Data

US 2015/0014216 A1  Jan. 15, 2015

Related U.S. Application Data

(60) Provisional application No. 61/837,387, filed on Jun. 20, 2013, provisional application No. 61/837,330, filed on Jun. 20, 2013, provisional application No. 61/837,353, filed on Jun. 20, 2013, provisional application No. 61/837,377, filed on Jun. 20, 2013.

(51) Int. Cl.
| | |
|---|---|
| *C10G 65/02* | (2006.01) |
| *C10G 45/16* | (2006.01) |
| *C10G 47/26* | (2006.01) |

(Continued)

(52) U.S. Cl.
CPC ............ *C10G 65/02* (2013.01); *B01J 23/8906* (2013.01); *B01J 23/8913* (2013.01); *C10G 45/16* (2013.01); *C10G 47/26* (2013.01); *C10G 49/12* (2013.01); *C10G 65/10* (2013.01); *C10G 65/12* (2013.01); *B01J 35/023* (2013.01); *C10G 2300/107* (2013.01); *C10G 2300/301* (2013.01)

(58) Field of Classification Search
CPC ...... C10G 65/00; C10G 65/02; C10G 67/02; C10G 69/02
See application file for complete search history.

(56) References Cited

U.S. PATENT DOCUMENTS

| | | |
|---|---|---|
| 4,151,070 A | 4/1979 | Allan et al. |
| 4,762,607 A | 8/1988 | Aldridge et al. |

(Continued)

FOREIGN PATENT DOCUMENTS

WO  2013033288 A2  3/2013

OTHER PUBLICATIONS

PCT Application No. PCT/US2014/043106, Communication from the International Searching Authority, Form PCT/ISA/220 (International Search Report), dated Sep. 18, 2014, 5 pages.

(Continued)

*Primary Examiner* — Brian McCaig
(74) *Attorney, Agent, or Firm* — David M. Weisberg; Chad A. Guice

(57) ABSTRACT

Systems and methods are provided for slurry hydroconversion of a heavy oil feed, such as an atmospheric or vacuum resid. The systems and methods allow for slurry hydroconversion using catalysts with enhanced activity. The catalysts with enhanced activity can be used in conjunction with demetallization catalysts or catalysts that can be recycled as a side product from a complementary refinery process.

19 Claims, 7 Drawing Sheets

(51) Int. Cl.
*C10G 49/12* (2006.01)
*C10G 65/10* (2006.01)
*C10G 65/12* (2006.01)
*B01J 23/89* (2006.01)
*C10G 65/00* (2006.01)
*C10G 67/02* (2006.01)
*C10G 69/02* (2006.01)
*B01J 35/02* (2006.01)

(56) References Cited

U.S. PATENT DOCUMENTS 5,755,955 A 5/1998 Benham et al.
7,288,182 B1 10/2007 Soled et al.
2009/0326302 A1* 12/2009 Bhattacharyya ....... B01J 23/745
585/653
2010/0065471 A1* 3/2010 Chabot ................. C10G 47/26
208/57
2010/0122939 A1 5/2010 Bauer et al.
2011/0210045 A1 9/2011 Kou et al.
2013/0075303 A1 3/2013 Heraud et al.
2013/0112593 A1 5/2013 Montanari et al.

OTHER PUBLICATIONS

PCT Application No. PCT/US2014/043106, Communication from the International Searching Authority, Form PCT/ISA/237 (Written Opinion), dated Sep. 18, 2014, 5 pages.

* cited by examiner

SLURRY HYDROCONVERSION WITH HIGH ACTIVITY CATALYSTS

CROSS-REFERENCE TO RELATED APPLICATIONS

This application claims the benefit of priority from U.S. Provisional Application 61/837,387, filed on Jun. 20, 2013, titled "Slurry Hydroconversion Using Enhanced Slurry Catalysts", the entirety of which is incorporated herein by reference. This application also claims the benefit of priority from U.S. Provisional Application 61/837,330, filed on Jun. 20, 2013, titled "Slurry Hydroconversion and Coking of Heavy Oils", the entirety of which is incorporated herein by reference. This application also claims the benefit of priority from U.S. Provisional Application 61/837,353, filed on Jun. 20, 2013, titled "Integrated Hydrocracking and Slurry Hydroconversion of Heavy Oils", the entirety of which is incorporated herein by reference. This application also claims the benefit of priority from U.S. Provisional Application 61/837,377, filed on Jun. 20, 2013, titled "Sequential Slurry Hydroconversion of Heavy Oils", the entirety of which is incorporated herein by reference.

FIELD OF THE INVENTION

This invention provides methods for processing of resids and other heavy oil feeds or refinery streams.

BACKGROUND OF THE INVENTION

Slurry hydroprocessing provides a method for conversion of high boiling, low value petroleum fractions into higher value liquid products. Slurry hydroconversion technology can process difficult feeds, such as feeds with high CCR weights, while still maintaining high liquid yields. In addition to vacuum resid feeds, slurry hydroconversion units have been used to process other challenging streams present in refinery/petrochemical complexes such as deasphalted rock, steam cracked tar, and visbreaker tar. Unfortunately, slurry hydroconversion is also an expensive refinery process from both a capital investment standpoint and a hydrogen consumption standpoint.

Various slurry hydroconversion configurations have previously been described. For example, U.S. Pat. No. 5,755,955 and U.S. Patent Application Publication 2010/0122939 provide examples of configurations for performing slurry hydroconversion. U.S. Patent Application Publication 2011/0210045 also describes examples of configurations for slurry hydroconversion, including examples of configurations where the heavy oil feed is diluted with a stream having a lower boiling point range, such as a vacuum gas oil stream and/or catalytic cracking slurry oil stream, and examples of configurations where a bottoms portion of the product from slurry hydroconversion is recycled to the slurry hydroconversion reactor.

U.S. Patent Application Publication 2013/0075303 describes a reaction system for combining slurry hydroconversion with a coking process. An unconverted portion of the feed after slurry hydroconversion is passed into a coker for further processing. The resulting coke is described as being high in metals. This coke can be combusted to allow for recovery of the metals or as a suitable disposal process. The recovered metals are described as being suitable for forming a catalytic solution for use as a catalyst in the slurry hydroconversion process.

U.S. Patent Application Publication 2013/0112593 describes a reaction system for performing slurry hydroconversion on a deasphalted heavy oil feed. The asphalt from a deasphalting process and a portion of the unconverted material from the slurry hydroconversion can be gasified to form hydrogen and carbon oxides.

SUMMARY OF THE INVENTION

In an aspect, a method for processing a heavy oil feedstock is provided. The method includes: providing a heavy oil feedstock having a 10% distillation point of at least about 650° F. (343° C.) and a first Conradson carbon residue wt %; exposing the heavy oil feedstock to a slurry hydroconversion catalyst in one or more reactors under effective slurry hydroconversion conditions to form a slurry hydroconversion effluent, the effective slurry hydroconversion conditions being effective for conversion of at least about 80 wt % of the second heavy oil feedstock relative to a conversion temperature of 1050° F. (566° C.), such as at least about 90 wt %; separating a bottoms product from the slurry hydroconversion effluent, the bottoms product having a 10% distillation point of at least about 650° F. (343° C.); and hydrocracking at least a portion of the bottoms product in the presence of a hydrocracking catalyst under effective hydrocracking conditions, the at least a portion of the bottoms product having a final boiling point of at least about 1050° F. (566° C.), wherein the slurry hydroconversion catalyst comprises a bulk multimetallic catalyst comprising at least one non-noble Group VIII (Group 8-10) metal and at least one Group VIB (Group 6) metal, a weight of the slurry hydroconversion catalyst being about 2 wt % to 25 wt % of a weight of the heavy oil feedstock in the reactor.

Optionally, the heavy oil feedstock can comprise about 5 vol % to about 50 vol % of catalyst slurry oil, a weight of fluid catalytic cracking catalyst fines comprising about 1 wt % to about 5 wt % of the heavy oil feedstock in the reactor, the slurry hydroconversion catalyst comprising about 2 wt % to about 20 wt % of the heavy oil feedstock in the reactor.

Optionally, the slurry hydroconversion catalyst further comprises a demetallization catalyst, a weight of the demetallization catalyst comprising about 5% to 50% of a total catalyst weight in the reactor, the total catalyst weight being about 2 wt % to about 25 wt % of the weight of the heavy oil feedstock in the reactor.

DETAILED DESCRIPTION OF THE EMBODIMENTS

Overview

Figure 1:
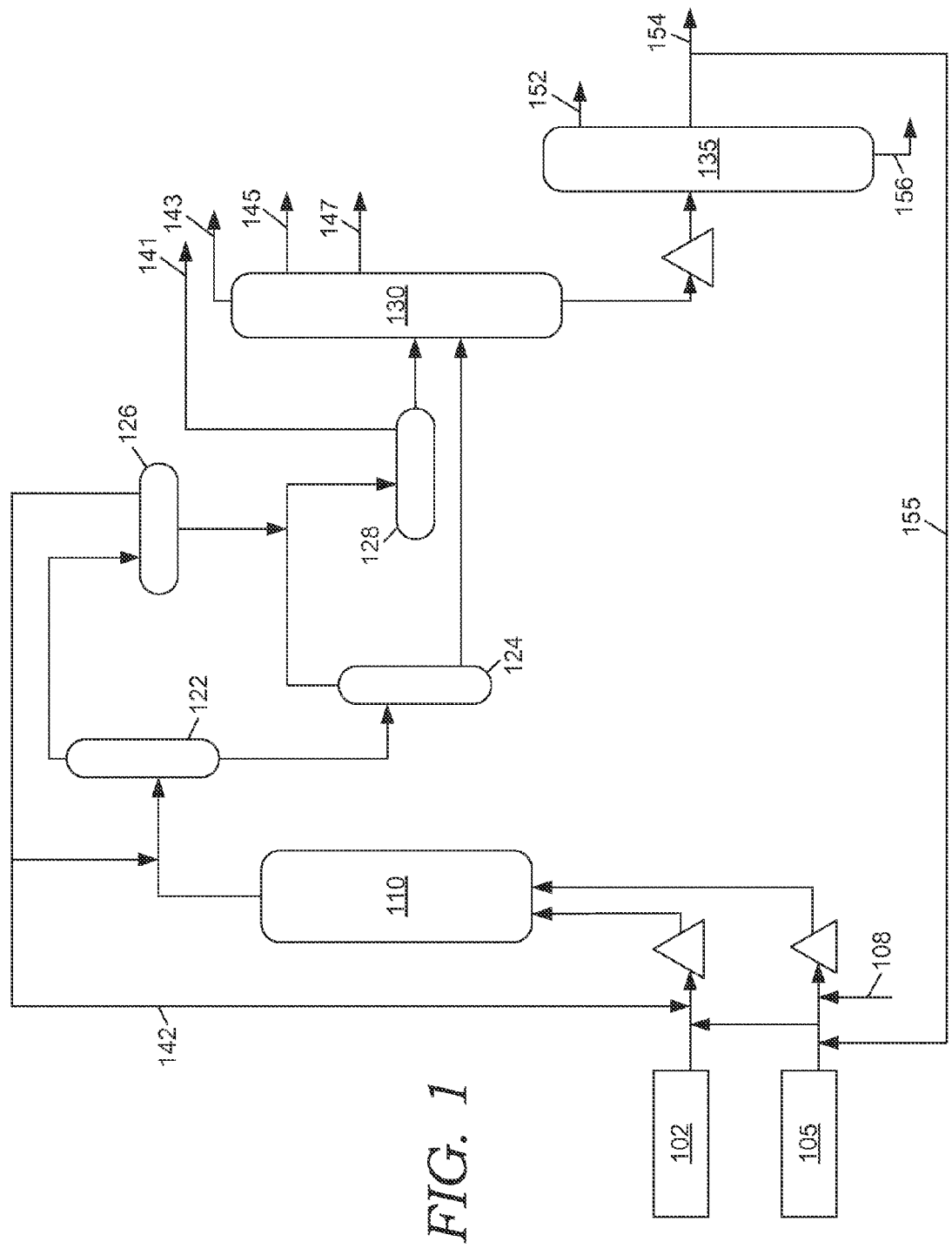
FIG. 1 shows an example of a slurry hydroconversion reaction system.

In various aspects, systems and methods are provided for performing slurry hydroconversion using an elevated weight percent of a high activity catalyst. The high activity catalyst can be a catalyst with activity for both hydrotreating and hydrocracking of a heavy oil or resid type feed. By using an elevated slurry concentration of a high activity catalyst, the yield of deeply hydrotreated distillate from slurry hydroprocessing can be increased. The increased yield can be due in part to the ability to reduce, minimize, or eliminate the amount of "pitch" generated as a product from the slurry hydroconversion process. Instead of forming a few weight percent of pitch when performing a slurry hydroconversion process on a heavy oil feed, substantially all of the liquid portion of the slurry hydroconversion effluent can be used and/or further processed for formation of fuel products, such as distillate fuels or low sulfur fuel oil.

Treating a feed that includes components with a boiling point of at least about 950° F. (510° C.), such as at least about 1050° F. (566° C.), the feed can be fractionated prior to hydroprocessing to form a resid or bottoms fraction containing the higher boiling components. The resid portion can be more difficult to hydrotreat, requiring higher severity conditions to remove sulfur to a desired level for fuels hydrocracking or lubes hydrocracking. Separating out the resid portion can prevent overprocessing of the distillate and gas oil portions of the feed. Conventionally, this resid portion is sometimes used to form fuel oil, asphalt, and/or other petroleum streams with a reduced value. Alternatively, a method such as slurry hydroprocessing can be used to try to increase the value of the resid fraction.

For conventional slurry hydroprocessing, one of the issues in handling the effluent from the slurry hydroprocessing reactor is that the effluent includes a portion of unconverted resid or "pitch". The pitch from conventional slurry hydroprocessing is a difficult fraction to process, as it is not believed to be suitable for processing in a traditional trickle-bed hydrocracking process, such as a distillate or fuels hydrocracker. For example, the pitch can still contain elevated levels of metals and/or nitrogen, which can degrade the performance as well as the lifetime of the typical catalysts used in a distillate hydrocracker. Additionally, the pitch can correspond to compounds with a high Conradson Carbon Residue (CCR) content. A high CCR content can indicate the presence of compounds that are likely to form coke or otherwise cause additional deposition on the catalyst in a conventional trickle bed reactor. One conventional solution is to separate out the pitch from the remaining effluent from a slurry hydrocracking reactor. However, this requires formation of separate fractions that are similar to a vacuum gas oil and a vacuum distillation bottoms, as opposed to simply performing an equivalent to atmospheric distillation on the slurry hydrocracking effluent to generate an atmospheric resid (or alternatively a vacuum gas oil that also contains a portion of 1050° F.+ (566° C.+) material). Additionally, after the pitch is separated, some type of additional processing is usually required in order to convert the pitch into some type of product that with a valuable end use.

The presence of pitch in the effluent from a conventional slurry hydroconversion process is due in part to the use of a lower activity slurry catalyst, such as a molybdenum sulfide catalyst, as well as a low concentration of catalyst. Such lower activity catalysts are often selected based on having a corresponding low cost. Because the catalyst in a slurry hydroconversion reactor is entrained with the feedstock (and therefore effluent), there is an increased risk of loss of catalyst due to entrainment with the effluent. While the use of a lower cost catalyst can mitigate the concern due to loss of catalyst, the corresponding lower activity can also lead to incomplete conversion of the resid portion of the feedstock to the slurry hydroprocessing unit.

In order to overcome at least some of the above difficulties, a higher concentration of a catalyst can be used. The higher catalyst concentration can include at least a portion of a catalyst with substantial hydrotreating activity, such as a bulk catalyst suitable for hydrotreating of distillate feeds. This can allow for production, for example, of a 650° F.+ (343° C.+) product from the slurry hydroconversion that is substantially demetallized, has a low CCR content, and that has a nitrogen content of about 500 wppm or less. This type of 650° F.+ (343° C.+) feed can be suitable directly for use as a feed for a medium pressure hydrocracker, such as a distillate hydrocracker.

Optionally, a secondary catalyst can be included with the high activity catalyst. For example, a demetallization catalyst can be used as a secondary catalyst. Including a demetallization catalyst can provide an additional catalyst surface that is believed to preferentially adsorb metals from a heavy oil or resid feed. This can extend the lifetime of the high activity catalyst.

Another option can be to introduce catalyst fines from an FCC process as a secondary catalyst, such as by introducing a FCC catalyst slurry oil into the slurry hydroprocessing reactor. In this type of aspect, the various portions of the FCC catalyst slurry oil can provide different benefits. The catalyst fines from the FCC catalyst slurry oil can assist with the conversion of the 1050° F.+ (566° C.+) portion of the heavy oil or resid feedstock. The oil portion of the FCC catalyst slurry oil can assist with maintaining the solubility of multi-ring fused aromatics in the feedstock during the slurry hydroprocessing.

In some aspects, improved yields of fuels and/or lubricants from a resid or other heavy oil feed can be achieved using slurry hydroconversion to convert at least about 65 wt % of the feed relative to a conversion temperature, such as 975° F. (524° C.) or 1050° F. (566° C.), or at least about 80 wt % of the feed, or at least about 90 wt % of the feed, or at least about 95 wt % of the feed. The desired amount of conversion can be achieved in a single reactor, or multiple slurry hydroconversion reactors can be used with intermediate fractionation to recover desirable product fractions. In alternative aspects wherein intermediate fractionation is used, naphtha and/or distillate products can be separated from the feed prior to full conversion. This can reduce or minimize the cracking of desirable boiling range products to lower value products such as light ends, while still allowing the overall severity of processing for the feedstock to remain at a desired level.

By using an elevated level of catalyst, including at least a portion of catalyst with substantial hydrotreating activity, all (or substantially all) of the effluent from the slurry hydrocracking reactor can be passed into typical refinery processes. The light ends (hydrocarbons with 4 carbons or less, by-product gases such as $H_2S$ or $NH_3$) can be handled according to typical refinery methods. The naphtha and distillate fuel fractions in the boiling range up to about 650° F. (343° C.), or up to about 700° F. (371° C.), can be added to their respective fuel pools, or optionally can be further hydroprocessed to achieve a desired sulfur and/or nitrogen level. The remaining portion of the effluent can roughly correspond to an atmospheric resid, with an boiling range of about 650° F.+(343° C.+), or about 700° F.+ (371° C.+). This remaining portion of the effluent can include an "unconverted" fraction of compounds with boiling points above about 1050° F. (566° C.). This unconverted fraction of compounds can represent up to about 5 wt % of the original feedstock, or up to about 10 wt % of the 650° F.+ (343° C.+) remaining portion. Based on the use of the elevated catalyst amount and/or the at least a portion of catalyst with substantial hydrotreating activity, the unconverted fraction of compounds with boiling points above about 1050° F. (566° C.) can have a reduced metals content, a reduced nitrogen content, and/or a reduced CCR content. The reduced metals, nitrogen, and CCR content of the 1050° F.+ (566° C.+) fraction of compounds can allow the 650° F.+ (343° C.+) portion can be passed into a distillate hydrocracker for formation of additional fuels without requiring separation. This means that a leftover "pitch" does not have to be removed from the atmospheric-resid-like portion prior to further processing.

Feedstocks

In various aspects, a hydroprocessed product is produced from a heavy oil feed component. Examples of heavy oils include, but are not limited to, heavy crude oils, distillation residues, heavy oils coming from catalytic treatment (such as heavy cycle bottom slurry oils from fluid catalytic cracking), thermal tars (such as oils from visbreaking, steam cracking, or similar thermal or non-catalytic processes), oils (such as bitumen) from oil sands and heavy oils derived from coal.

Heavy oil feedstocks can be liquid or semi-solid. Examples of heavy oils that can be hydroprocessed, treated or upgraded according to this invention include bitumens and residuum from refinery distillation processes, including atmospheric and vacuum distillation processes. Such heavy oils can have an initial boiling point of 650° F. (343° C.) or greater. Preferably, the heavy oils will have a 10% distillation point of at least 650° F. (343° C.), alternatively at least 660° F. (349° C.) or at least 750° F. (399° C.). In some aspects the 10% distillation point can be still greater, such as at least 900° F. (482° C.), or at least 950° F. (510° C.), or at least 975° F. (524° C.), or at least 1020° F. (549° C.) or at least 1050° F. (566° C.). In this discussion, boiling points can be determined by a convenient method, such as ASTM D86, ASTM D2887, or another suitable standard method.

In addition to initial boiling points and/or 10% distillation points, other distillation points may also be useful in characterizing a feedstock. For example, a feedstock can be characterized based on the portion of the feedstock that boils above 1050° F. (566° C.). In some aspects, a feedstock can have a 70% distillation point of 1050° F. or greater, or a 60% distillation point of 1050° F. or greater, or a 50% distillation point of 1050° F. or greater, or a 40% distillation point of 1050° F. or greater.

Density, or weight per volume, of the heavy hydrocarbon can be determined according to ASTM D287-92 (2006) Standard Test Method for API Gravity of Crude Petroleum and Petroleum Products (Hydrometer Method), and is provided in terms of API gravity. In general, the higher the API gravity, the less dense the oil. API gravity is 20° or less in one aspect, 15° or less in another aspect, and 10° or less in another aspect.

Heavy oils can be high in metals. For example, the heavy oil can be high in total nickel, vanadium and iron contents. In one embodiment, the heavy oil will contain at least 0.00005 grams of Ni/V/Fe (50 ppm) or at least 0.0002 grams of Ni/V/Fe (200 ppm) per gram of heavy oil, on a total elemental basis of nickel, vanadium and iron. In other aspects, the heavy oil can contain at least about 500 wppm of nickel, vanadium, and iron, such as at least about 1000 wppm.

Contaminants such as nitrogen and sulfur are typically found in heavy oils, often in organically-bound form. Nitrogen content can range from about 50 wppm to about 10,000 wppm elemental nitrogen or more, based on total weight of the heavy hydrocarbon component. The nitrogen containing compounds can be present as basic or non-basic nitrogen species. Examples of basic nitrogen species include quinolines and substituted quinolines. Examples of non-basic nitrogen species include carbazoles and substituted carbazoles.

The invention is particularly suited to treating heavy oils containing at least 500 wppm elemental sulfur, based on total weight of the heavy oil. Generally, the sulfur content of such heavy oils can range from about 500 wppm to about 100,000 wppm elemental sulfur, or from about 1000 wppm to about 50,000 wppm, or from about 1000 wppm to about 30,000 wppm, based on total weight of the heavy component. Sulfur will usually be present as organically bound sulfur. Examples of such sulfur compounds include the class of heterocyclic sulfur compounds such as thiophenes, tetrahydrothiophenes, benzothiophenes and their higher homologs and analogs. Other organically bound sulfur compounds include aliphatic, naphthenic, and aromatic mercaptans, sulfides, and di- and polysulfides.

Heavy oils can be high in n-pentane asphaltenes. In some aspects, the heavy oil can contain at least about 5 wt % of n-pentane asphaltenes, such as at least about 10 wt % or at least 15 wt % n-pentane asphaltenes.

Still another method for characterizing a heavy oil feedstock is based on the Conradson carbon residue of the feedstock. The Conradson carbon residue of the feedstock can be at least about 5 wt %, such as at least about 10 wt % or at least about 20 wt %. Additionally or alternately, the Conradson carbon residue of the feedstock can be about 50 wt % or less, such as about 40 wt % or less or about 30 wt % or less.

In various aspects of the invention, reference may be made to one or more types of fractions generated during distillation of a petroleum feedstock. Such fractions may include naphtha fractions, kerosene fractions, diesel fractions, and vacuum gas oil fractions. Each of these types of fractions can be defined based on a boiling range, such as a boiling range that includes at least 90 wt % of the fraction, and preferably at least 95 wt % of the fraction. For example, for many types of naphtha fractions, at least 90 wt % of the fraction, and preferably at least 95 wt %, can have a boiling point in the range of 85° F. (29° C.) to 350° F. (177° C.). For some heavier naphtha fractions, at least 90 wt % of the fraction, and preferably at least 95 wt %, can have a boiling point in the range of 85° F. (29° C.) to 400° F. (204° C.). For a kerosene fraction, at least 90 wt % of the fraction, and preferably at least 95 wt % can have a boiling point in the range of 300° F. (149° C.) to 600° F. (288° C.). Alternatively, for a kerosene fraction targeted for some uses, such as jet fuel production, at least 90 wt % of the fraction, and preferably at least 95 wt %, can have a boiling point in the range of 300° F. (149° C.) to 550° F. (288° C.). For a diesel fraction, at least 90 wt % of the fraction, and preferably at least 95 wt %, can have a boiling point in the range of 400° F. (204° C.) to 750° F. (399° C.).

Catalyst Recycle

Based on the use of elevated quantities of catalyst in the slurry hydroprocessing reactor, effective separation and recycle of the catalyst can be beneficial. A variety of techniques can be used for separating catalyst (or at least a portion of the catalyst) from the slurry hydroconversion effluent prior to passing the effluent to another refinery process. Each of the following separation methods can be used alone or in any convenient combination, such as using multiple instances of a separation method and/or combining a plurality of the separation methods.

One option for enabling catalyst recycle can be to incorporate filters into the slurry hydroconversion reactor. In this type of aspect, as effluent passes upward to exit from the reactor, a filter can be used to retain the catalyst in the reactor. This can have an effect similar to the catalyst being held up within the reactor. Catalyst retained within the reactor does not need to be recycled. Instead, a purge stream of catalyst can be withdrawn from the reactor to allow for introduction of fresh catalyst, so that the overall activity of the catalyst in the slurry hydroconversion reactor can be maintained.

Another option for enabling catalyst recycle can be to use a filter in the flow path of the effluent that exits from the reactor. A single filter can be used to remove substantially all catalyst entrained in the flow, or a plurality of filters can be used to allow smaller particles to pass through a first filter. For example, during the slurry hydroconversion process, at least some catalyst fines may be generated. Depending on the aspect, a single filter could be sized to allow some catalyst fines to pass through and exit with the effluent; or a single filter could be sized to separate out both catalyst particles and catalyst fines; or multiple filters can be used, so that a first filter separates out the catalyst particles and a second filter separates out catalyst fines. When a filter is used for separating catalyst particles from the effluent, more than one flow path can be provided in parallel for the effluent, so that at least one flow path can be taken off-line for periods of time to clean or refresh the filter(s).

Still another option can be to use a settler for removal of catalyst from the slurry hydroconversion reactor effluent. Of course, a combination of settlers and filters could be used, such as using a first settling stage to remove a majority of the catalyst particles and then using a filter to remove the remaining portion of the catalyst.

In some aspects, more then one type of catalyst may be present within the slurry hydroconversion reactor. Depending on the relative sizes of the catalyst, different separation and recycle techniques may be used for the different catalysts.

As an example, the catalyst system for slurry hydroconversion can be a combination of a bulk hydroprocessing catalyst and a demetallization catalyst. The two catalysts can be ground to different sizes. For example, the bulk hydroprocessing catalyst can be ground (or synthesized) to have a particle size of less than about 100 µm, such as about 40 µm to about 80 µm, while the demetellization catalyst can be ground (or synthesized) to have a larger particle size, such as about 100 µm to about 500 µm or more. In this type of example, while it would be possible to separate both types of catalysts using a single type of separation, it can be advantageous to use different separation techniques for the two catalyst types. In some aspects, for the bulk hydrotreating catalyst, the catalyst particles can be separated using settling tanks and/or filters to remove the catalyst from the slurry hydroconversion effluent. For the demetallization catalyst, the larger size of the catalyst particles can be used to allow for a different separation method. Because of the larger particle size, the demetallization particles may not be entrained in the flow within the reactor. Thus, instead of becoming entrained in the slurry flow and exiting the reactor with the effluent, the demetallization particles can be held up in the reactor. In this type of aspect, the larger particle size demetallization catalyst can be withdrawn from the lower portion of the reactor to allow for removal of spent catalyst. A portion of the bulk hydroprocessing catalyst may also be withdrawn during removal of the demetallization catalyst.

As another type of example, if a catalytic slurry oil (from a fluid catalytic cracking process) is used as a portion of the feed to the slurry hydroconversion reactor, the catalytic slurry oil can contain catalyst fines corresponding to the catalyst that was used in the fluid catalytic cracking (FCC) process. The particle size of the FCC catalyst fines can be about 30 µm or less. If a (high activity) hydrotreating catalyst with a particle size of 40 µm to 100 µm is used, different separation steps can potentially be used for separating the high activity hydrotreating catalyst and the FCC catalyst fines from the slurry hydroconversion effluent. Alternatively, the amount of FCC catalyst fines in a catalytic slurry oil can typically be about 1 wt % to about 5 wt % of the catalytic slurry oil. This is a sufficiently low concentration that removal of the catalyst fines with the catalyst purge for the high activity hydrotreating catalyst may be sufficient.

After separation of catalyst, the high activity hydrotreating catalyst can be recycled to the slurry hydroconversion reactor for further use. A catalyst purge stream can be used to withdraw a portion of the high activity hydrotreating catalyst to allow for introduction of fresh catalyst. A similar combination of recycle and purge can be used for other catalysts present, such as a demetallization catalyst. For the FCC catalyst fines from the catalytic slurry oil, recycle is typically not necessary, as the FCC catalyst fines in the feedstock can provide the new catalyst for the slurry hydroconversion reactor.

Slurry Hydroconversion

FIG. 1 shows an example of a reaction system suitable for performing slurry hydroconversion. The configuration in FIG. 1 is provided as an aid in understanding the general features of a slurry hydroconversion process. It should be understood that, unless otherwise specified, the conditions described in association with FIG. 1 can generally be applied to any convenient slurry hydroconversion configuration.

In FIG. 1, a heavy oil feedstock 105 is mixed with a catalyst 108 prior to entering one or more slurry hydroconversion reactors 110. The mixture of feedstock 105 and catalyst 108 can be heated prior to entering reactor 110 in order to achieve a desired temperature for the slurry hydroconversion reaction. A hydrogen stream 102 is also fed into reactor 110. Optionally, a portion of feedstock 105 can be mixed with hydrogen stream 102 prior to hydrogen stream 102 entering reactor 110. Optionally, feedstock 105 can also include a portion of recycled vacuum gas oil 155. Optionally, hydrogen stream 102 can also include a portion of recycled hydrogen 142.

The effluent from slurry hydroconversion reactor(s) 110 is passed into one or more separation stages. For example, an initial separation stage can be a high pressure, high temperature (HPHT) separator 122. A higher boiling portion from the HPHT separator 122 can be passed to a low pressure, high temperature (LPHT) separator 124 while a lower boiling (gas) portion from the HPHT separator 122 can be passed to a high temperature, low pressure (HTLP) separator 126. The higher boiling portion from the LPHT separator 124 can be passed into a fractionator 130. The lower boiling portion from LPHT separator 124 can be combined with the higher boiling portion from HPLT separator 126 and passed into a low pressure, low temperature (LPLT) separator 128. The lower boiling portion from HPLT separator 126 can be used as a recycled hydrogen stream 142, optionally after removal of gas phase contaminants from the stream such as $H_2S$ or $NH_3$. The lower boiling portion from LPLT separator 128 can be used as a flash gas or fuel gas 141. The higher boiling portion from LPLT separator 128 is also passed into fractionator 130.

In some configurations, HPHT separator 122 can operate at a temperature similar to the outlet temperature of the slurry hydroconversion reactor 110. This reduces the amount of energy required to operate the HPHT separator 122. However, this also means that both the lower boiling portion and the higher boiling portion from the HPHT separator 122 undergo the full range of distillation and further processing steps prior to any recycling of unconverted feed to reactor 110.

In an alternative configuration, the higher boiling portion from HPHT separator 122 is used as a recycle stream 118 that is added back into feed 105 for processing in reactor 110. In this type of alternative configuration, the effluent from reactor 110 can be heated to reduce the amount of converted material that is recycled via recycle stream 118. This allows the conditions in HPHT separator 122 to be separated from the reaction conditions in reactor 110.

In FIG. 1, fractionator 130 is shown as an atmospheric fractionator. The fractionator 130 can be used to form a plurality of product streams, such as a light ends or C4⁻ stream 143, one or more naphtha streams 145, one or more diesel and/or distillate (including kerosene) fuel streams 147, and a bottoms fraction. The bottoms fraction can then be passed into vacuum fractionator 135 to form, for example, a light vacuum gas oil 152, a heavy vacuum gas oil 154, and a bottoms or pitch fraction 156. Optionally, other types and/or more types of vacuum gas oil fractions can be generated from vacuum fractionator 135. The heavy vacuum gas oil fraction 154 can be at least partially used to form a recycle stream 155 for combination with heavy oil feed 105.

In a reaction system, slurry hydroconversion can be performed by processing a feed in one or more slurry hydroconversion reactors. The reaction conditions in a slurry hydroconversion reactor can vary based on the nature of the catalyst, the nature of the feed, the desired products, and/or the desired amount of conversion.

With regard to catalyst, in some types of slurry hydroprocessing, suitable catalyst concentrations can range from about 50 wppm to about 20,000 wppm (or about 2 wt %), depending on the nature of the catalyst. Catalyst can be incorporated into a hydrocarbon feedstock directly, or the catalyst can be incorporated into a side or slip stream of feed and then combined with the main flow of feedstock. Still another option is to form catalyst in-situ by introducing a catalyst precursor into a feed (or a side/slip stream of feed) and forming catalyst by a subsequent reaction. In other aspects that are discussed below, higher concentrations of catalyst can be used when performing slurry hydroprocessing.

Catalytically active metals for use in hydroprocessing can include those from Group IVB, Group VB, Group VIB, Group VIIB, or Group VIII of the Periodic Table. Examples of suitable metals include iron, nickel, molybdenum, vanadium, tungsten, cobalt, ruthenium, and mixtures thereof. The catalytically active metal may be present as a solid particulate in elemental form or as an organic compound or an inorganic compound such as a sulfide (e.g., iron sulfide) or other ionic compound. Metal or metal compound nanoaggregates may also be used to form the solid particulates.

A catalyst in the form of a solid particulate is generally a compound of a catalytically active metal, or a metal in elemental form, either alone or supported on a refractory material such as an inorganic metal oxide (e.g., alumina, silica, titania, zirconia, and mixtures thereof). Other suitable refractory materials can include carbon, coal, and clays. Zeolites and non-zeolitic molecular sieves are also useful as solid supports. One advantage of using a support is its ability to act as a "coke getter" or adsorbent of asphaltene precursors that might otherwise lead to fouling of process equipment.

In some aspects, it can be desirable to form catalyst for slurry hydroconversion in situ, such as forming catalyst from a metal sulfate (e.g., iron sulfate monohydrate) catalyst precursor or another type of catalyst precursor that decomposes or reacts in the hydroprocessing reaction zone environment, or in a pretreatment step, to form a desired, well-dispersed and catalytically active solid particulate (e.g., as iron sulfide). Precursors also include oil-soluble organometallic compounds containing the catalytically active metal of interest that thermally decompose to form the solid particulate (e.g., iron sulfide) having catalytic activity. Other suitable precursors include metal oxides that may be converted to catalytically active (or more catalytically active) compounds such as metal sulfides. In a particular embodiment, a metal oxide containing mineral may be used as a precursor of a solid particulate comprising the catalytically active metal (e.g., iron sulfide) on an inorganic refractory metal oxide support (e.g., alumina).

The reaction conditions within a slurry hydroconversion reactor can include a temperature of about 400° C. to about 480° C., such as at least about 425° C., or about 450° C. or less. Some types of slurry hydroconversion reactors are operated under high hydrogen partial pressure conditions, such as having a hydrogen partial pressure of about 1200 psig (8.3 MPag) to about 3400 psig (23.4 MPag), for example at least about 1500 psig (10.3 MPag), or at least about 2000 psig (13.8 MPag). Examples of hydrogen partial pressures can be about 1200 psig (8.3 MPag) to about 3000 psig (20.7 MPag), or about 1200 psig (8.3 MPag) to about 2500 psig (17.2 MPag), or about 1500 psig (10.3 MPag) to about 3400 psig (23.4 MPag), or about 1500 psig (10.3 MPag) to about 3000 psig (20.7 MPag), or about 1500 psig (8.3 MPag) to about 2500 psig (17.2 MPag), or about 2000 psig (13.8 MPag) to about 3400 psig (23.4 MPag), or about 2000 psig (13.8 MPag) to about 3000 psig (20.7 MPag). Since the catalyst is in slurry form within the feedstock, the space velocity for a slurry hydroconversion reactor can be characterized based on the volume of feed processed relative to the volume of the reactor used for processing the feed. Suitable space velocities for slurry hydroconversion can range, for example, from about 0.05 $v/v/hr^{-1}$ to about 5 $v/v/hr^{-1}$, such as about 0.1 $v/v/hr^{-1}$ to about 2 $v/v/hr^{-1}$.

The reaction conditions for slurry hydroconversion can be selected so that the net conversion of feed across all slurry hydroconversion reactors (if there is more than one arranged in series) is at least about 80%, such as at least about 90%, or at least about 95%. For slurry hydroconversion, conversion is defined as conversion of compounds with boiling points greater than a conversion temperature, such as 975° F. (524° C.), to compounds with boiling points below the conversion temperature. Alternatively, the conversion temperature for defining the amount of conversion can be 1050° F. (566° C.). The portion of a heavy feed that is unconverted after slurry hydroconversion can be referred to as pitch or a bottoms fraction from the slurry hydroconversion.

In some alternative aspects, multiple slurry hydroconversion stages and/or reactors can be used for conversion of a feed. In such aspects, the effluent from a first slurry hydroconversion stage can be fractionated to separate out one or more product fractions. For example, the feed can be fractionated to separate out one or more naphtha fractions and/or distillate fuel (such as diesel) fractions. Such a fractionation can also separate out lower boiling compounds, such as compounds containing 4 carbons or less and contaminant gases such as $H_2S$ or $NH_3$. The remaining higher boiling fraction of the feed can have a boiling range roughly corresponding to an atmospheric resid, such as a 10 wt % boiling point of at least about 650° F. (343° C.) or at least about 700° F. (371° C.). At to least a portion of this higher boiling fraction can be passed into a second (or later) slurry hydroconversion stage for additional conversion of the 975° F.+ (524° C.) portion, or optionally the 1050° F.+ (566° C.) portion of the feed. By separating out the lower boiling portions after performing an intermediate level of conversion, the amount of "overcracking" of desirable products can be reduced or minimized.

In aspects where multiple slurry hydroconversion stages are used to achieve an overall conversion level, the conditions for an initial slurry hydroconversion stage can be selected to achieve about 25 wt % to about 60 wt % conversion on the 975° F.+ (524° C.) portion, or optionally the 1050° F.+ (566° C.) portion of the feed, such as at least about 35 wt % or at least about 45 wt %, or about 50 wt % or less, or about 40 wt % or less. The conditions in a second (or other subsequent) slurry hydroconversion stage can then be selected to achieve a total desired level of conversion for the 975° F.+ (524° C.) portion or 1050° F.+ (566° C.) portion of the feed as described above.

In some aspects, using multiple stages of slurry hydroconversion reactors can allow for selection of different processing conditions in the stages and/or reactors. For example, the temperature in the first slurry hydroconversion reactor can be lower than the temperature in a second reactor. In such an aspect, the second effective hydroprocessing conditions for use in the second slurry hydroconversion reactor can include a temperature that is at least about 5° C. greater than a temperature for the first effective slurry hydroprocessing conditions in the first reactor, or at least about 10° C. greater, or at least about 15° C. greater, or at least about 20° C. greater, or at least about 30° C. greater, or at least about 40° C. greater, or at least about 50° C. greater. From a practical standpoint, typical slurry hydroprocessing temperatures are from about 400° C. to about 480° C., so the difference between any two reaction stages can typically be about 80° C. or less.

Additionally or alternately to having a different temperature between slurry hydroconversion stages, the hydrogen partial pressure and/or total pressure used in a first slurry hydroconversion stage can differ from a second slurry hydroconversion stage. One option is to have a lower hydrogen partial pressure and/or lower total pressure for a first slurry hydroconversion stage. This can reflect the desire to have lower severity conditions in the first slurry hydroconversion stage relative to a subsequent stage. For example, the hydrogen partial pressure in a first slurry hydroconversion stage can be lower than a hydrogen partial pressure in a subsequent (such as a second or later) slurry hydroconversion stage by at least about 50 psi (350 kPa), or at least about 100 psi (690 kPa), or at least about 200 psi (1380 kPa). In aspects where roughly comparable amounts of hydrogen are delivered in the treat gases to various stages, one option for controlling the hydrogen partial pressure can be to select a lower total pressure for a first stage relative to a subsequent stage. For example, the total pressure in a first slurry hydroconversion stage can be lower than a total pressure in a subsequent (such as a second or later) slurry hydroconversion stage by at least about 50 psi (350 kPa), or at least about 100 psi (690 kPa), or at least about 200 psi (1380 kPa), or at least about 300 psi (2070 kPa). Still another alternative can be to have a lower hydrogen partial pressure in a second or other subsequent slurry hydroconversion stage relative to a first slurry hydroconversion stage. For example, the hydrogen partial pressure in a second (or other subsequent) slurry hydroconversion stage can be lower than a hydrogen partial pressure in a first slurry hydroconversion stage by at least about 50 psi (350 kPa), or at least about 100 psi (690 kPa), or at least about 200 psi (1380 kPa).

When multiple reactors are used, the catalyst for the slurry hydroconversion can be passed between reactors with a single recycle loop. In this type of configuration, catalyst is separated from the heavy product fraction of the final hydroconversion stage and then at least partially recycled to an earlier hydroconversion stage. Alternatively, a separate catalyst recycle loop can be used for at least one slurry hydroconversion stage. For example, if a plurality of reactors are used, the slurry catalyst can be separated from the heavy portion of the effluent from each reactor. The separated catalyst from the first reactor can then be recycled back to the first reactor, the separated catalyst from the second reactor can be recycled back to the second reactor, and separated catalyst from each additional reactor (if any) can be recycled to the corresponding reactor. Still another option is to have multiple catalyst separations and recycle loops, but to have fewer recycle loops than the total number of reactors. For example, a first reactor can have a separate catalyst recycle loop, while catalyst can be passed between a second and third reactor, with catalyst separated from the product effluent of the third reactor and recycled (at least in part) back to the second reactor.

When more than one catalyst recycle loop is used, the catalyst recycle loop for a stage can be effective for reducing the weight percentage of catalyst in an output fraction. For example, the weight percentage of catalyst in an output fraction after catalyst separation can be about 25% or less of the weight percentage in the fraction prior to separation, or about 15% or less, or about 10% or less.

Figure 4:
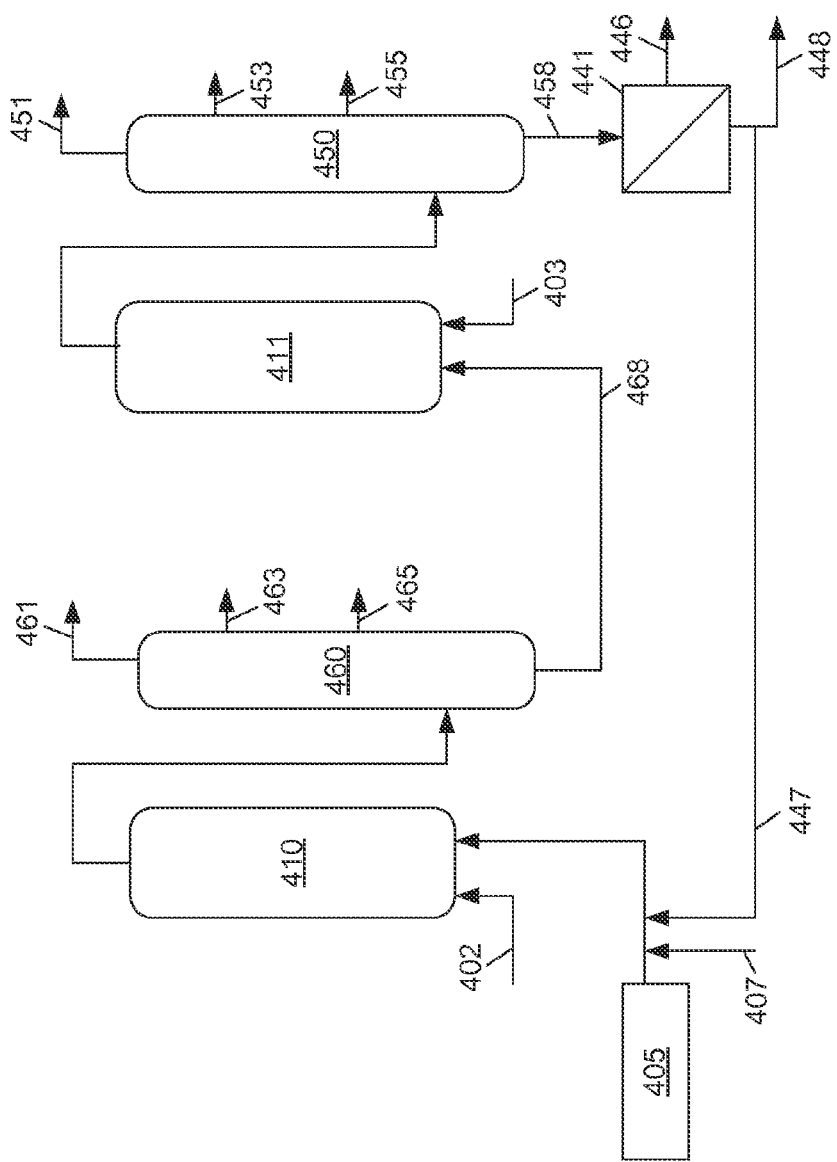
FIG. 4 shows an example of a configuration involving multiple slurry hydroconversion reactors with interstage separation.

FIG. 4 shows an example of an alternative configuration for performing slurry hydroprocessing using multiple stages and/or reactors. In a configuration such as FIG. 4, multiple stages of slurry hydroprocessing can be performed under different processing conditions. A separation or fractionation can be performed between stages to allow for removal of product fractions. This can increase the recovery of higher value products by reducing or minimizing overprocessing of the feedstock to the slurry hydroprocessing stages.

In FIG. 4, a heavy oil feed 405 (or a feed including at least a heavy oil portion) is passed into a slurry hydroconversion reactor 410. In the configuration shown in FIG. 4, an input stream of hydrogen 402 is also introduced into reactor 410. The input stream of hydrogen 402 can correspond to a fresh hydrogen stream, a recycled hydrogen stream from a downstream stage of the reaction system, or another convenient hydrogen stream. Optionally, hydrogen stream 402 can be mixed with feed 405 prior to entering reactor 410. In the configuration shown in FIG. 4, a stream of recycled catalyst 447 is shown as being mixed with feed 405. The catalyst from recycled catalyst stream 447 can be supplemented with additional fresh catalyst 407.

The feed 405 (including catalyst from recycled catalyst stream 447 and/or fresh catalyst 407) is passed into slurry hydroprocessing reactor 410. The reactor 410 can be operated under effective slurry hydroprocessing conditions for converting a portion of the resid in the feed. Because the configuration in FIG. 4 includes multiple slurry hydroconversion reactors, the effective conditions can be selected to produce an intermediate amount of conversion, such as about 20 wt % to about 60 wt % of the 975° F.+ portion of the feed. The effluent from reactor 410 can be separated or fractionated, such as in a fractionator 460. This can form a variety of fractions, such as a light ends fraction 461, a naphtha fraction 463, a diesel fraction 465, and a higher boiling fraction 468. It is noted that the catalyst in the slurry can be primarily entrained in the higher boiling fraction 468.

The higher boiling fraction 468 can be passed into a second slurry hydroconversion reactor 411 along with additional hydrogen 403. The higher boiling fraction can be processed under second effective slurry hydroprocessing conditions in reactor 411 to achieve a desired total amount of conversion of the 975° F.+ (524° C.) portion or the 1050° F.+ (566° C.) portion of the original feed. The effluent from reactor 411 can then be fractionated 450 to form, for example, a light ends fraction 451, a naphtha fraction 453, a distillate fuel fraction 455, and a higher boiling fraction 458. This higher boiling fraction 458 can correspond to a bottoms or resid fraction. The slurry catalyst can typically be entrained in the higher boiling fraction 458. The higher boiling fraction 458 can then be separated, such as by using a settler 441, a filter, or another type of separator, to separate a vacuum gas oil fraction 446 from the slurry catalyst. Optionally, at least a portion of vacuum gas oil fraction 446 can correspond to compounds having a boiling point above the conversion temperature, such as a conversion temperature of about 975° F. (524° C.) or 1050° F. (566° C.). A portion of the slurry catalyst can be purged 448 from the reaction system, while a remaining portion of the slurry catalyst can be recycled 407 for use again in the slurry hydroconversion reactors. Purging a portion of the slurry catalyst can reduce or minimize the build up of heavy metals that may deposit on the catalyst during the slurry hydroconversion process.

Figure 5:
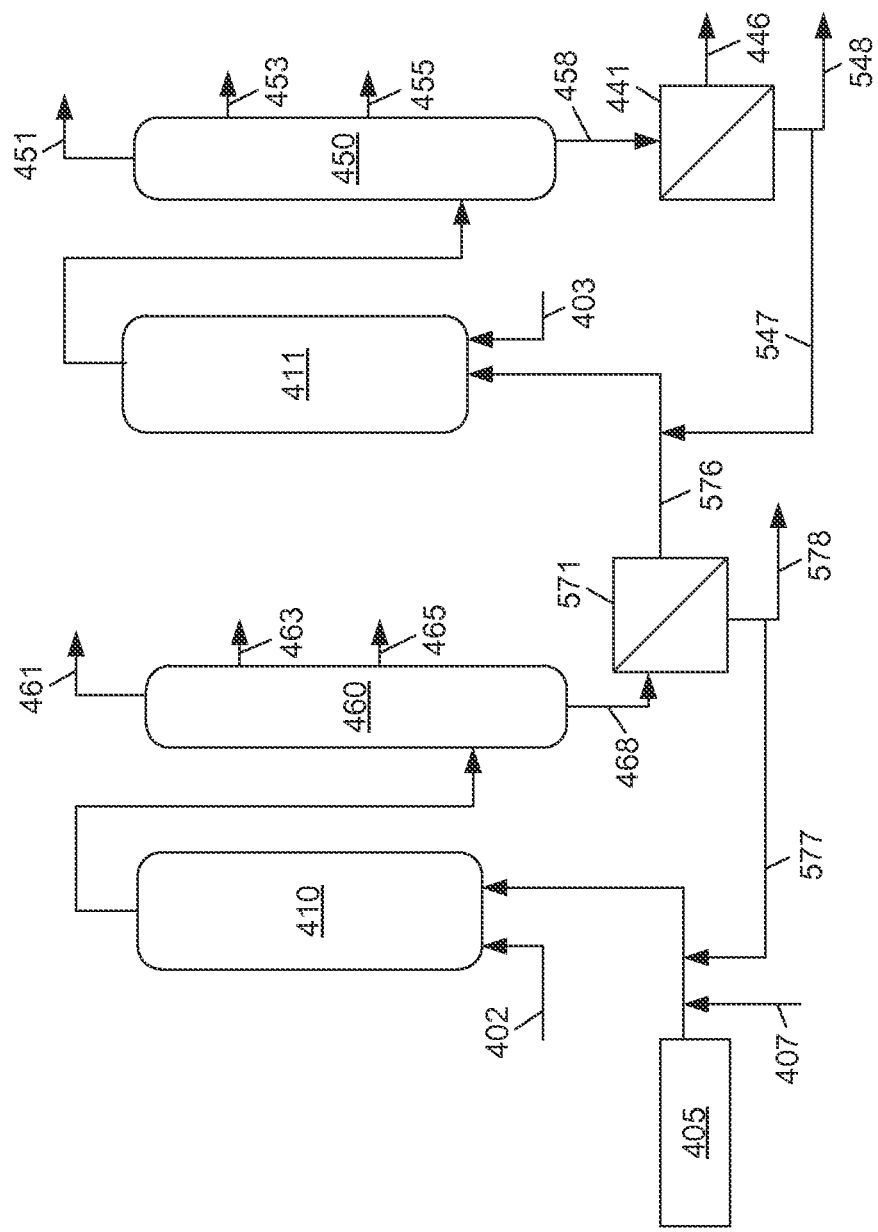
FIG. 5 shows an example of a configuration involving multiple slurry hydroconversion reactors with interstage separation.

In the configuration shown in FIG. 4, the slurry hydroprocessing catalyst is passed from the first reactor 410 to the second reactor 411 during processing. The catalyst is then separated out using settler 441 or another type of separator or filter. However, another option for handling the catalyst within multiple slurry hydroconversion reactors can be to have a separate catalyst recycle loop for each reactor and/or stage. This type of configuration is shown in FIG. 5. In FIG. 5, many of the elements shown are similar to FIG. 4. In FIG. 5, the higher boiling portion 468 of the effluent from the first slurry hydroconversion reactor 410 can typically contain a majority of the slurry catalyst, such as at least about 50 wt % of the catalyst present in the effluent from the reactor 410 prior to fractionation. However, most of the catalyst from the first slurry hydroconversion reactor 410 is not passed into the second reactor. Instead, a settler 471 or another type of separator or filter is used to separate the catalyst from the higher boiling feed portion 468. This results in a separated higher boiling portion 576 that includes a weight percentage of catalyst that is about 25% or less of the weight percentage of catalyst in the higher boiling feed portion 468, or about 15% or less, or about 10% or less. After the separation, the separated higher boiling portion 576 is used as the input feed for the second slurry hydroconversion reactor 411. A portion of the separated catalyst is purged from the system 578, while a remaining portion of the separated catalyst is recycled 576. A similar separation can be performed on the higher boiling portion 458, to produce a catalyst recycle stream 547 and a catalyst purge stream 548.

Figure 6:
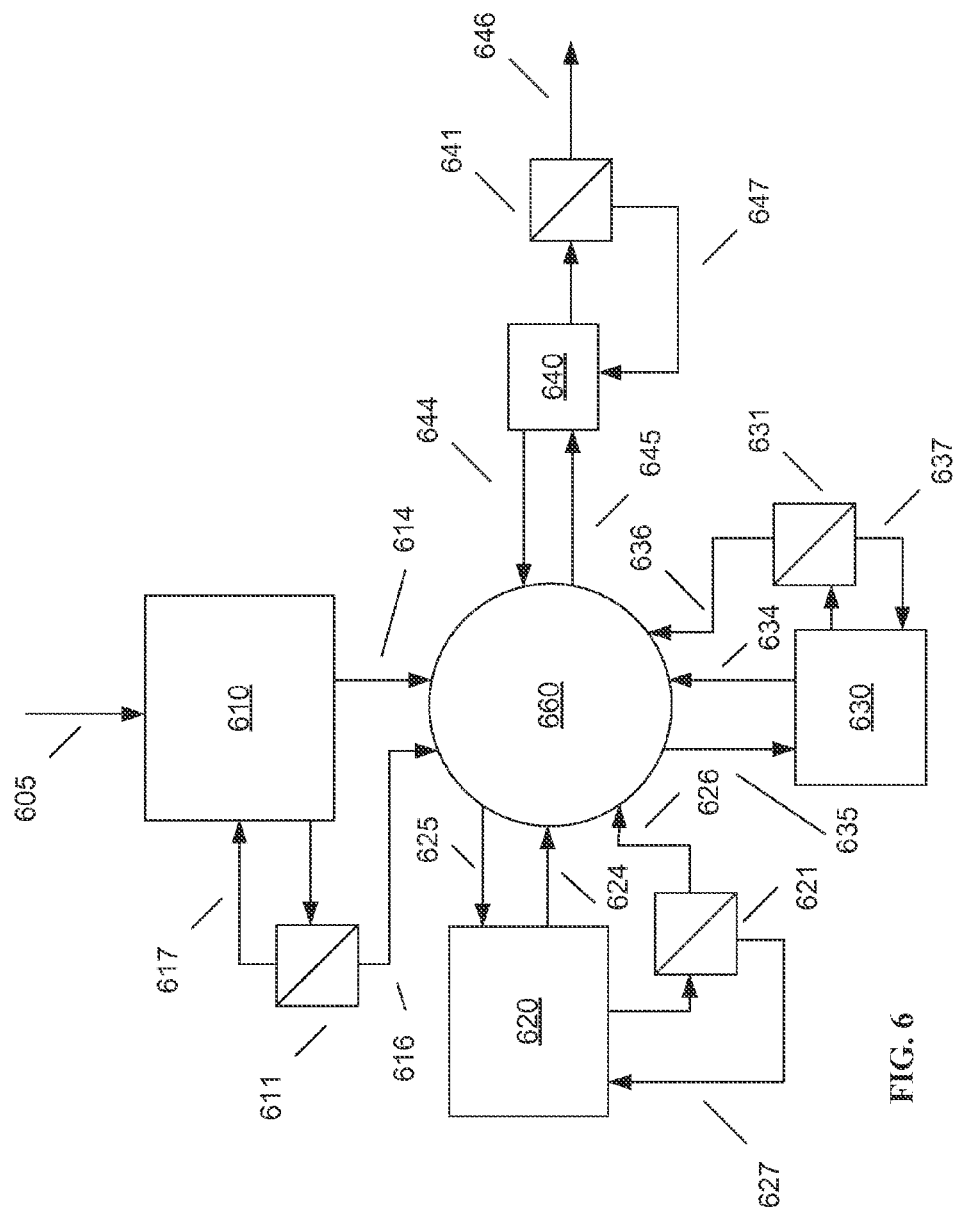
FIGS. 6 and 7 show an example of a configuration for using a divided wall fractionator in conjunction with multiple slurry hydroconversion reactors.

FIG. 6 shows still another configuration for using multiple slurry hydroconversion reactors for treatment of a feed. In FIG. 6, a configuration is schematically shown for using a single fractionator containing internal dividing walls for performing fractionation on effluents from multiple slurry hydroconversion reactors. In the example shown in FIG. 6, a fractionator 660 with internal dividing walls is shown as being associated with four separate slurry hydroconversion reactors 610, 620, 630, and 640. Of course, other numbers or groupings for a plurality of hydroconversion reactors can be used with a divided wall fractionator.

In the example shown in FIG. 6, a feed 605 for slurry hydroconversion (such as a resid feed) is passed into slurry hydroconversion reactor 610. In FIG. 6, a flash separator (not shown) or another simple separation device can be used to separate the effluent from the slurry hydroconversion reactor 610 into a lighter fraction 614 and a bottoms (or other higher boiling) fraction that includes the majority of the slurry catalyst. The bottoms fraction is passed through a settler 611 (or another type of separator) to produce a catalyst recycle stream 617 and a bottoms fraction 616 with a reduced content of slurry catalyst. Both lighter fraction 614 and bottoms fraction 616 with reduced content of slurry catalyst can then be passed into the divided wall fractionator 660.

Figure 7:
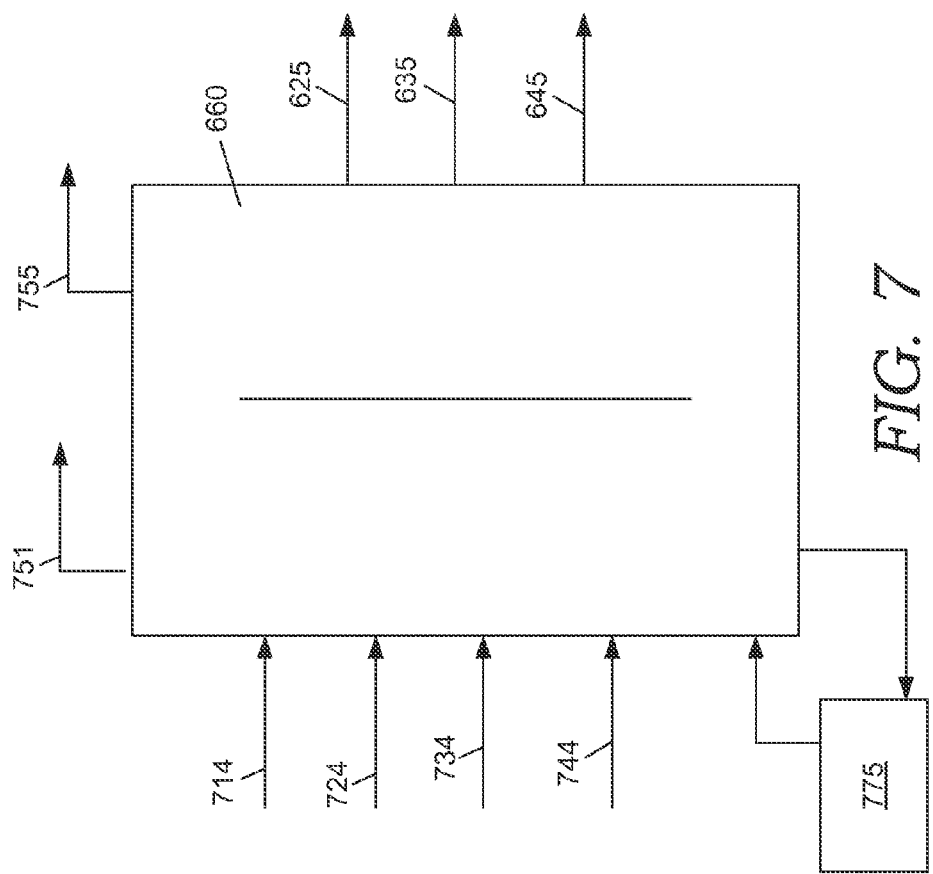

The divided wall fractionator can then be used to distribute portions of the lighter fraction 614 and bottoms fraction 616 to additional slurry hydroconversion reactors 620, 630, and 640. In FIG. 7, the lighter fraction and the bottoms fraction with reduced catalyst content from the first reactor are represented by a single input stream 714. The similar lighter fractions and bottoms fractions from the other reactors in FIG. 6 are represented by input streams 724, 734, and 744. The various fractions are introduced into the divided wall fractionator 660 on a first side of the divider. Lighter fractions are removed from the fractionator 660 above the dividing wall. This can include, for example, light ends 751 and one or more naphtha or distillate fuel fractions 755.

As shown in FIG. 7, output streams 625, 635, and 645 are withdrawn from fractionator 660 at various heights (on the opposite side of the dividing wall) corresponding to different boiling ranges within the resid boiling range. The output stream 625 is used to feed reactor 620 as shown in FIG. 6, and similarly output stream 635 feeds reactor 630 while output stream 645 feeds reactor 640. This allows reactors 620, 630, and 640 to process fractions with different boiling ranges, to allow for further adjustment of conditions in each of reactors 620, 630, and 640 to improve overall yield. Similar to the situation for reactor 610, the stream 625/635/645 is passed into slurry hydroconversion reactor 620/630/640. In FIG. 6, a flash separator (not shown) or another simple separation device can be used to separate the effluent from the slurry hydroconversion reactor 620/630/640 into a lighter fraction 624/634/644 and a bottoms (or other higher boiling) fraction 626/636/646 that includes the majority of the slurry catalyst. The bottoms fraction 626/636/646 is passed through a settler 621/631/641 to produce a catalyst recycle stream 627/637/647 and a bottoms fraction 626/636/646 with a reduced content of slurry catalyst. For reactors 620 and 630, both lighter fraction 624/634 and bottoms fraction 626/636 with reduced content of slurry catalyst are passed into the divided wall fractionator 660. For reactor 640, the lighter fraction 644 is also passed into the divided wall fractionator 660. The bottoms fraction 646 represents a vacuum gas oil product that can be used as low sulfur fuel oil and/or can be further hydroprocessed to form additional fuel products.

Use of Bulk Metal Catalysts with Hydrotreating Activity

Conventional slurry hydroconversion catalysts are effective for conversion of a heavy oil feed into lower boiling components. However, the resulting conversion products typically still have sulfur and/or nitrogen contents that are not suitable for use as finished products, such as fuel or lubricant products. As a result, the liquid product fractions from slurry hydroconversion are typically hydrotreated, either by hydrotreating a wide cut of the liquid products or by hydrotreating individual products after fractionation. In either case, additional hydroprocessing is required for the slurry hydroconversion products.

In some aspects, a slurry hydroconversion catalyst with increased hydrotreating activity can be used for processing of a heavy oil feed. The bulk catalyst can include at least one Group VIII metal and at least one Group VIB metal. As used herein, the term "bulk", when describing a mixed metal oxide catalyst composition, indicates that the catalyst composition is self-supporting in that it does not require a carrier or support. It is well understood that bulk catalysts may have some minor amount of carrier or support material in their compositions (e.g., about 20 wt % or less, about 15 wt % or less, about 10 wt % or less, about 5 wt % or less, or substantially no carrier or support, based on the total weight of the catalyst composition); for instance, bulk hydroprocessing catalysts may contain a minor amount of a binder, e.g., to improve the physical and/or thermal properties of the catalyst. In contrast, heterogeneous or supported catalyst systems typically comprise a carrier or support onto which one or more catalytically active materials are deposited, often using an impregnation or coating technique. Nevertheless, heterogeneous catalyst systems without a carrier or support (or with a minor amount of carrier or support) are generally referred to as bulk catalysts and are frequently formed by co-precipitation techniques.

The bulk catalyst is wet ball milled before activation so it is well dispersed in the vacuum resid (or other heavy oil feed) under slurry hydrocracking conditions. The bulk catalyst is sized (such as wet ball milled) to a particle size of about 40 μm to about 100 μm, for example about 50 μm to about 100 μm or about 40 μm to about 80 μm or about 50 μm to about 80 μm. Alternatively, the bulk catalyst can be milled to a size of about 5 μm or less. In this type of alternative aspect, the use of a small particle size catalyst can reduces or minimize coke formation under slurry hydrocracking conditions (high 1050° F.+ (566° C.) conversion) because of the high dispersion.

A total catalyst concentration in the range of about 2 wt % to about 25 wt %, of the feed can be beneficial for providing high hydrotreating activity in the slurry hydroconversion reactor. For example, the total catalyst concentration can be about 5 wt % to about 25 wt %, or about 2 wt % to about 20 wt %, or about 5 wt % to 20 wt %. In aspects where multiple catalysts are used, the combined weight in the slurry of catalyst can correspond to about 2 wt % to about 25 wt %. In such aspects, the amount of the bulk hydrotreating catalyst can be at least about 1 wt %. For example, the amount of bulk hydrotreating catalyst can be about 1 wt % to about 20 wt %, or about 2 wt % to about 20 wt %, or about 5 wt % to about 20 wt %, or about 2 wt % to 15 wt %, or about 5 wt % to 15 wt %. Additionally or alternately, the amount of bulk hydrotreating catalyst can represent at least 50% of the total weight of catalyst in the slurry, such as at least about 60% of the total catalyst weight, or at least about 75% of the total catalyst weight. When a demetallization catalyst is used as a second catalyst, the amount of demetallization catalyst can be about 5% to about 50% of the total catalyst weight in the slurry. When a catalyst slurry oil is added to the feed to the slurry hydroconversion reactor, the catalyst fines in the catalyst slurry oil can be about 1 wt % to about 5 wt % of the slurry.

When a high activity hydrotreating catalyst is used as the slurry catalyst, such as an elevated concentration of a bulk hydrotreating catalyst, the naphtha and distillate coming from the slurry hydroconversion can have a reduced amount of S and N relative to a conventional slurry hydroconversion process. The slurry hydroconversion products are potentially suitable for direct product blending, such as having a sulfur content of about 100 wppm or less, or about 50 wppm or less. Alternatively, the naphtha and distillate products can be exposed to further hydroprocessing, such as additional hydrotreating or hydrocracking.

In a continuous flow slurry hydrocracker, a bulk catalyst concentration of about 2 wt % to about 25 wt % can result in a certain hold-up of the catalyst. Preferably the catalyst hold-up in the slurry reactor is 25% of the reactor or more (25-50 wt % range). In some aspects, there can be a good hold-up of the bulk metal catalyst in the slurry hydrocracker because of its high density. The bulk metal catalyst density can be 2-3 times greater than the density of conventional slurry hydrotreating catalysts. Hold-up of the catalyst in the high solids slurry hydrocracker can be monitored through internal sensors (laser, ultrasonic). The entrained bulk metal slurry catalysts can be concentrated in the product VGO stream (which can alternatively be referred to as an atmospheric resid). The bulk catalyst entrained with the effluent from the slurry reactor can be separated from the product VGO stream and recycled for further use.

The entrainment of the bulk metal slurry catalyst depends upon the flow rate of the liquid and gas in to the slurry hydrocracker. Ideally, linear settlement velocity of the solids/bulk metal catalysts (determined by Stokes' law) is greater than the linear liquid velocity in to the slurry hydrocracker to maintain catalyst hold-up in the reactor. But certain entrainment of the bulk metal slurry catalyst in the product stream can be beneficial since it provides the option to remove part of the deactivated bulk metal slurry catalyst and replenish with fresh catalyst. Fresh bulk metal slurry catalyst can be incorporated in to fresh resid or incorporated into a slide or slip stream. Another option to add bulk metal catalyst continuously to the high pressure high solids slurry hydrocracker is through a catalyst hopper-storage system.

A feed can be exposed to the catalyst in the presence of hydrogen under effective slurry hydroconversion conditions. The amount of catalyst amount can be about 2 wt % to about 25 wt % of the feed. Preferably, a catalyst recycle loop can be used to allow for capture and return of catalyst to the slurry hydroconversion reactor. During each pass through the recycle loop, a portion of the bulk metal catalyst can be purged as a metals stream, since the catalyst is deactivated by Ni and V metals present in the resid. Catalyst removed as part of a catalyst purge is then replaced by addition of fresh catalyst.

Figure 2:
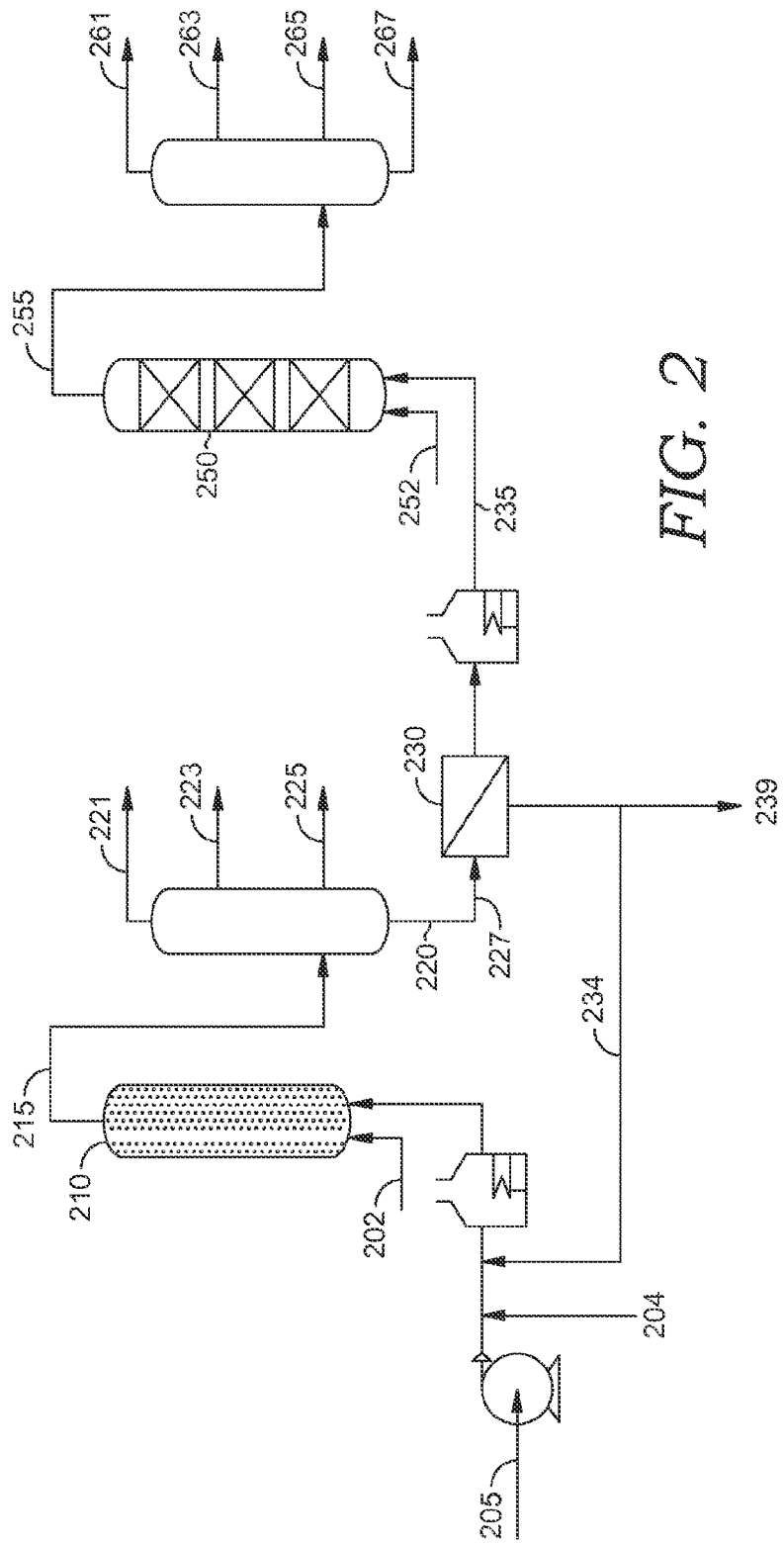
FIG. 2 shows an example of integration of a slurry hydroconversion reactor with fixed bed reactor(s).

FIG. 2 shows an example of a slurry hydroconversion reactor that is configured for use with an elevated amount of a bulk hydrotreating catalyst. In FIG. 2, a vacuum resid 205 or another type of heavy oil feedstock is introduced into a slurry hydrotreating reactor 210. Prior to entering the reactor, the feedstock 205 is combined with a slurry hydroconversion catalyst. A portion of the catalyst can be fresh or makeup catalyst 204, while a second portion of the catalyst can correspond to recycled catalyst 234. A hydrogen treat gas stream 202 is also introduced into reactor 210. The feedstock 205 is then exposed to the slurry hydroprocessing catalyst within reactor 210 under effective slurry hydroconversion conditions.

The effluent 215 from slurry hydroconversion reactor 210 can be fractionated 220 to form a plurality of products, including one or more light ends products 221, one or more naphtha products 223, and one or more distillate products 225. Due to the high activity of the bulk hydrotreating catalyst, the various products can be suitable for use without further hydrotreatment, or the products can optionally be hydrotreated to reduce the content of heteroatoms such as sulfur or nitrogen prior to further use. The fractionator 220 can also produce a bottoms fraction 227. Based on the boiling range, the bottoms fraction 227 can roughly correspond to an atmospheric resid, or alternatively the bottoms fraction 227 can be considered to substantially contain vacuum gas oil boiling range compounds. A portion of the bottoms fraction can correspond to compounds with boiling points greater than about 1050° F. (566° C.). However, unlike a conventional slurry hydroconversion process, the compounds with boiling points greater than about 1050° F. (566° C.) have been upgraded to have a lower metals content, lower nitrogen content, and/or lower CCR content. As a result, a separate pitch stream containing these 1050° F.+ (566° C.) compounds does not need to be formed. Instead, the higher boiling compounds can be retained with the bottoms fraction 227 for further processing.

The bottoms fraction 227 can also contain bulk catalyst that is entrained in the effluent 215 from the reactor 210. The catalyst in bottoms fraction 227 can be separated 230 to form a catalyst recycle steam 234 and a stream 235 with reduced catalyst content. A portion of the catalyst recycle stream 234 can be withdrawn as a catalyst purge stream 239. Optionally but preferably, the separation method 230 can be suitable for removing both the bulk catalyst as well as any bulk catalyst fines that are formed during processing in reactor 210.

The stream 235 can then be passed into a hydroprocessing reactor for further upgrading. For example, the stream 235 can be passed into a hydrocracking reactor 250 along with a hydrogen treat gas stream 252 for processing under effective hydrocracking conditions. The hydrocracked effluent 255 can then be fractionated 260 to form a plurality of products. The products can include a light ends product 261, one or more naphtha products 263, one or more distillate fuel products 265, and one or more vacuum gas oil or bottoms portions 267. The bottoms portions 267 can be used as a higher boiling range fuel product, such as a low sulfur fuel oil. Alternatively, the bottoms portions 267 can undergo further hydroprocessing (such as hydrocracking or catalytic dewaxing) to form additional distillate fuel.

Use of Slurry Co-Catalysts

In some aspects, multiple types of catalysts can be used within a slurry hydroprocessing reaction system. Of course, one option can be to have reactors arranged in series, with a different catalyst used in each reactor. In this type of aspect, each reactor can have a dedicated catalyst separation and recycle loop. Another option can be to use more than one catalyst in at least one reaction stage or reactor.

If a second catalyst type (or other additional catalyst type) is incorporated into a slurry hydroprocessing reaction system, a suitable second catalyst can be a conventional slurry hydroprocessing catalyst, such as an $MoS_2$ catalyst or the other types of conventional slurry hydroprocessing catalysts described herein.

Another option for a second catalyst type is a demetallization catalyst. Demetallization catalysts can generally refer to catalysts with a larger pore size. The demetallization catalyst can correspond to just a catalyst support material, such as alumina or silica, but it is also acceptable to have catalytic metals supported on the support material. Without being bound by any particular theory, due to the larger pore size of the support material for a demetallization catalyst, it is believed that heavy metals within a feedstock can preferentially adsorb on a demetallization catalyst. For example, the heavy metals in a feedstock can often be associated with high boiling, larger size compounds in a feed. These larger compounds may be able to more easily access the larger pores in a demetallization catalyst, which allows the demetallization catalyst to preferentially remove the metals from the feed. Due to the preferential adsorption, even if another catalyst is present with the demetallization catalyst, the demetallization catalyst can adsorb metals in a proportion greater than what would be otherwise indicated based on the relative weight percentage of catalyst in the catalyst mixture. This can allow a lower cost demetallization catalyst to adsorb metals that otherwise might be deposited on the higher activity hydrotreating catalyst. Examples of metals that may be contained within a heavy oil feed that may preferentially adsorb on a demetallization catalyst include Ni and V.

A demetallization catalyst can have a pore size distribution that includes a substantial portion of large pores, such as pores with an average diameter of 100 to 600 Angstroms. For example, at least about 25% of the pore volume can correspond to pores having a diameter of 100 to 600 Angstroms.

In various aspects, the size of the demetallization catalyst can be different from the size of the high activity hydrotreating catalyst. For example, the average particle size for the high activity hydrotreating catalyst can be about 40 μm to about 100 μm. The demetallization catalyst can be from about 100 μm to about 600 μm, or from about 150 μm to about 600 μm. The larger size of the demetallization catalyst can allow for separate methods for separation and/or recycle of the demetallization catalyst and the high activity hydrotreating catalyst.

One option for taking advantage of the different particle sizes can be use of filters which allow the hydrotreating catalyst to pass through while preventing passage of the larger demetallization catalyst particles. For example, an initial barrier filter within the slurry hydroconversion reactor can be used to retain the demetallization catalyst in the reactor while the smaller hydrotreating catalyst particles continue with the reactor effluent for later separation. The demetallization catalyst can be removed from the reactor via a purge stream, with fresh catalyst added to maintain a desired amount of the demetallization catalyst in the reactor.

Another option can be based in part on the impact of the larger catalyst particle size on the entrainment of the demetallization catalysts in the feedstock. Due to the larger particle size, the demetallization catalyst can be less effectively entrained in the feed. As a result, rather than exiting the reactor with effluent, the demetallization catalyst can be held up in the reactor. This can allow for two different methods of removing catalyst. The demetallization catalyst can be removed from the reactor as a purge stream, to allow for refresh of the demetallization catalyst. Optionally, a portion of the hydrotreating catalyst can also be removed as part of this purge stream. The majority of the hydrotreating catalyst can leave the slurry hydroconversion reactor with the effluent. This portion of the hydrotreating catalyst can be separated from the effluent in one or more filtration or settling stages. The separation of the hydrotreating catalyst can occur prior to or after fractionation of the effluent to separate lower boiling fractions from a bottoms portion. If the hydrotreating catalyst is separated after fractionation, the catalyst can be separated from the bottoms portion from the fractionator (or other separation stage). The separated hydrotreating catalyst can then be recycled (or at least a portion can be recycled) back to the slurry hydroconversion reactor.

Still another option for separating the hydrotreating catalyst and the demetallization catalyst from the feedstock or the effluent can be to take advantage of the density difference between the catalysts. In this type of aspect, the demetallization catalyst and the hydrotreating catalyst can be separated in a common stage, such as a filtration or settling separation stage. The demetallization catalyst can then be separated from the hydrotreating catalyst by providing enough fluid to allow for density separation of the catalysts. The demetallization catalyst can then be removed as a top layer, or by using a centrifuge, or by any other convenient method such as elutriation or sedimentation.

Figure 3:
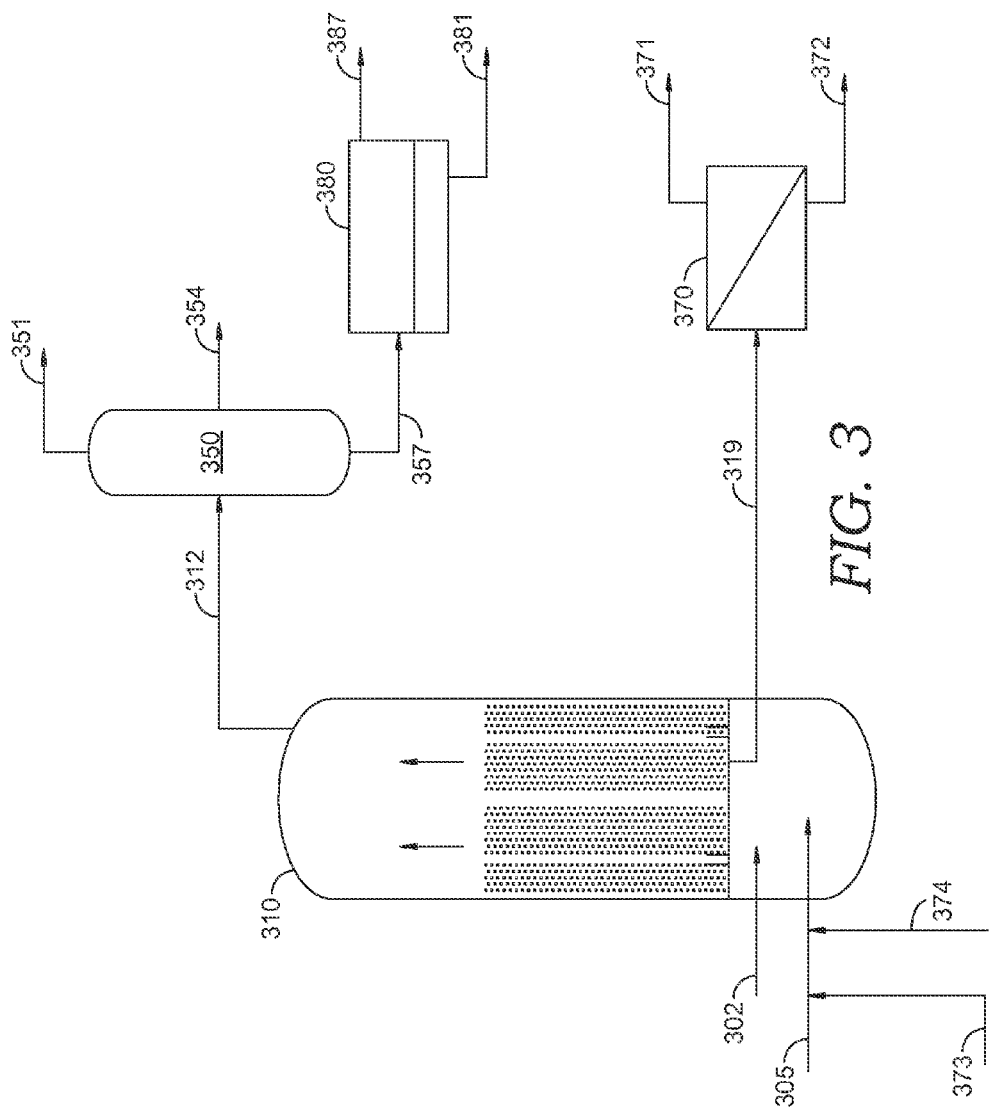
FIG. 3 shows an example a slurry hydroconversion reactor for use with multiple types of catalysts.

FIG. 3 shows an example of a configuration for a slurry hydroconversion reactor suitable for use with a catalyst system comprising a bulk multimetallic catalyst and a demetallization catalyst. In FIG. 3, a feedstock 305 such as a vacuum resid feed is passed into a slurry hydroconversion reactor 310 along with a hydrogen treat gas stream 302. Prior to entering the reactor, the feedstock 305 can be combined with recycled bulk hydrotreating catalyst 373 and fresh or make-up demetallization catalyst 374.

The feedstock 305 is then exposed to bulk hydrotreating catalyst and demetallization catalyst in reactor 310 under effective slurry hydroconversion conditions to generate a slurry hydroconversion effluent 312. In some aspects, the slurry hydroconversion effluent 312 can include both entrained demetallization catalyst and entrained bulk hydrotreating catalyst. Alternatively, a filter (not shown) may be included in reactor 310 to allow the larger demetallization catalyst particles to be retained in reactor 310, so that substantially all of the entrained catalyst in the slurry hydroconversion effluent 312 is bulk hydrotreating catalyst. In this type of aspect, a catalyst purge stream 319 can be withdrawn from the reactor to allow for introduction of fresh demetallization catalyst 374, in order to maintain the ability of the demetallization catalyst to preferentially adsorb metals from feedstock 305. The catalyst purge stream 319 can be passed into a separator 370, such as a filter separator or a settling stage, to separate spent demetallization catalyst 372 from the bulk hydrotreating catalyst 371. The bulk hydrotreating catalyst 371 can be recycled as part of recycled catalyst 373 for additional use in the reactor 310, or at least a portion (or all) of the bulk hydrotreating catalyst 371 can be purged, so that additional fresh bulk hydrotreating catalyst can be added to the reactor.

The slurry hydroconversion effluent 312 can be passed into a separation stage 350, such as a fractionator. The fractionator 350 can produce a plurality of products, including light ends 351, one or more liquid products 354 such as naphtha products or distillate fuel products, and a bottoms product 357. Based on the boiling range for the bottoms product 357, the bottoms product can be referred to as a vacuum gas oil product or an atmospheric resid product. The bottoms product 357 can include the bulk hydrotreating catalyst (or other catalyst) that is entrained in slurry hydroconversion effluent 312. The bottoms product 357 can be passed into a separation stage 380, such as a hot settling stage, to separate the entrained catalyst 381 from the remaining vacuum gas oil portion 387 of the bottoms product. The vacuum gas oil portion 387 can be used as a low sulfur fuel oil, or exposed to additional hydroprocessing as described, for example, in FIG. 2. The bulk hydrotreating catalyst 381 that was entrained with the slurry hydroconversion effluent can be recycled as part of recycled catalyst 373 for additional use in the reactor 310, or at least a portion of the bulk hydrotreating catalyst 381 can be purged, so that additional fresh bulk hydrotreating catalyst can be added to the reactor Use of Slurry Co-Catalysts: Catalytic Slurry Oil An alternative way of introducing a second catalyst into the slurry hydroprocessing reactor is to include in the feedstock a feed source that contains a catalyst. An example of a feed source that includes a catalyst can be a catalyst slurry oil (CSO) from an FCC process. CSO is a by-product of VGO cracking in FCC and is rich in 3-ring and 4-ring fused ring aromatics and cannot be cracked further under conventional FCC conditions. Co-processing of CSO in a conventional slurry hydrocracker (i.e., without a high concentration of bulk metal catalyst) will not result in significant conversion of CSO, as fused ring aromatics do not crack under conventional slurry hydrocracker thermal conditions. In a conventional slurry hydrocracker, CSO conversion or upgrade by hydrodesulfurization (HDS), hydrodenitrogenation (HDN), and/or aromatic saturation is not feasible because of the low activity of Fe or Mo based additives for hydrotreating reactions. Since CSO is rich in 3- and 4-ring fused aromatics, however, it is a good solvent to prevent the heavy fused-ring aromatics in the resid from phase separating (leads to fouling) at intermediate conversion. The primary value of co-processing CSO with resid in a conventional slurry hydrocracker is to avoid fouling in a conventional slurry hydrocracker.

In contrast to conventional slurry hydroconversion conditions, diluting resids with streams such as CSO and processing them in a high solid slurry hydrocracker can provide significant benefits. The high hydrotreating activity of the bulk metal catalyst in the high solid slurry hydrocracker enables conversion of CSO by HDS, HDN, and aromatic saturation to liquids/distillate range products. Co-processing of CSO with resid in a high solids slurry hydrocracker utilizing a bulk metal catalyst can reduce fouling issues as described in the case above. Additionally, high solids slurry hydrocracker employing a bulk metal catalyst facilitates conversion of disadvantaged feeds such as CSO by HDS, HDN and aromatic saturation. These additional activity and reaction benefits of high solids slurry hydroconversion when using a bulk metal catalyst are generally applicable to other types of feeds as well.

In addition to the benefits for upgrading of the CSO, addition of the CSO to a resid can also provide benefits for processing of the resid. As noted above, addition of the CSO to a resid or other heavy oil feed can help to maintain the solubility of asphaltenes and other compounds in the heavy oil feed during the slurry hydroconversion. The catalyst fines in a CSO are typically a zeolite type catalyst, such as USY zeolite, or another type of molecular sieve for catalysis of cracking reactions. Due to the hydrogen present in the slurry hydroconversion conditions, the zeolite (or other molecular sieve) type catalyst fines can provide additional activity for conversion of the resid or heavy oil feed. This can provide an additional advantage of reducing the amount of high activity hydrotreating catalyst that is needed for the slurry hydroconversion reactor.

The catalyst fines from the CSO can be separated from the effluent of the slurry hydroconversion reactor in the same separation process(es) used for separating the high activity hydrotreating catalyst for recycle. The concentration of the catalyst fines from the FCC slurry oil can be controlled by controlling the catalyst purge stream for the high activity hydrotreating catalyst. The oil portion of the CSO exits the slurry hydroconversion reactor as either part of the fuel products from the reactor or as part of a vacuum gas oil fraction.

Additional Types of Bulk Metal Catalysts

Trimetallic Catalysts—In some aspects, a suitable catalyst can be a bulk multimetallic catalyst that includes at least one Group VII non-noble metal and at least two Group VIB metals. The ratio of Group VIB metal to Group VIII non-noble metal is from about 10:1 to about 1:10. In some embodiments, the bulk metal catalyst is represented by the formula: $(X)_b(Mo)_c(W)_dO_z$; wherein X is a non-noble Group VIII metal; the molar ratio of b(c+d) is 0.5/1 to 3/1; the molar ratio of c:d is at least 0.01/1; and z=[2b+6(c+d)]2. Optionally but preferably, the molar ratio of b:(c+d) is 0.75/1 to 1.5/1 and the molar ratio of c:d is 1/10 to 10/1. Performing slurry hydroconversion using such a bulk metal catalyst results in a processed feedstock with reduced levels of both nitrogen and sulfur. The Group VIII non-noble metal can selected from Ni and Co. As an example, when the Group VIII metal is Ni, in some aspects the bulk metal catalyst can have an X-ray diffraction pattern that is essentially amorphous with crystalline peaks at d=2.53 Angstroms and d=1.70 Angstroms.

In some aspects, the bulk metal catalyst can be prepared in situ in the heavy oil feed. For example, a heavy oil feedstock is hydroprocessed in the presence of the bulk multimetallic catalyst prepared by steps that comprise: (a) adding to a hydrocarbon feedstock having a Conradson carbon content up to about 50 weight percent, one or more thermally decomposable metal compound in an amount sufficient to provide the ratio of atoms of feedstock Conradson carbon, calculated as elemental carbon, to atoms of metal constituents of said one or more thermally decomposable metal compounds of less than about 750 to 1, said metal constituent being at least one Group VIII non-noble metal and at least two Group VIB metals; (b) heating said thermally decomposable metal compound within said feedstcok at an elevated temperature in the presence of a hydrogen-containing gas to produce a solid high surface area catalyst comprised of at least one Group VIII non-noble metal and at least two Group VIB metals wherein the ratio of Group VIB metal to Group VIII non-noble metal is about 10:1 to about 1:10; and (c) recovering said high surface area catalyst.

To obtain a bulk catalyst composition with high catalytic activity, it is therefore preferred that the metal components, which are at least partly in the solid state during contacting, are porous metal components. It is desired that the total pore volume and pore size distribution of these metal components is approximately the same as those of conventional hydrotreating catalysts. Conventional hydrotreating catalysts generally have a pore volume of 0.05-5 ml/g, preferably of 0.1-4 ml/g, more preferably of 0.1-3 ml/g and most preferably of 0.1-2 ml/g determined by nitrogen adsorption. Pores with a diameter smaller than 1 nm are generally not present in conventional hydrotreating catalysts. Further, conventional hydrotreating catalysts have generally a surface area of at least 10 m$^2$/g and more preferably of at least 50 m$^2$/g and most preferably of at least 100 m$^2$/g, determined via the B.E.T. method. For instance, nickel carbonate can be chosen which has a total pore volume of 0.19-0.39 ml/g and preferably of 0.24-0.35 ml/g determined by nitrogen adsorption and a surface area of 150-400 m$^2$/g and more preferably of 200-370 m$^2$/g determined by the B.E.T. method. Furthermore these metal components should have a median particle diameter of at least 50 nm, more preferably at least 100 nm, and preferably not more than 5000 μm and more preferably not more than 3000 μm. After ball milling (or another sizing process), the median particle diameter can be about 40 μm to about 100 μm, such as about 80 μm or less. For instance, by choosing a metal component which is added at least partly in the solid state and which has a large median particle diameter, the other metal components will only react with, the outer layer of the large metal component particle. In this case, so-called "core-shell" structured bulk catalyst particles are obtained.

An appropriate morphology and texture of the metal component can either be achieved by applying suitable preformed metal components or by preparing these metal components by the above-described precipitation under such conditions that a suitable morphology and texture is obtained. A proper selection of appropriate precipitation conditions can be made by routine experimentation.

As has been set out above, to retain the morphology and texture of the metal components which are added at least partly in the solid state, it is essential that the metal of the metal component at least partly remains in the solid state during the whole process of this solid route. It is noted again that it is essential that in no case should the amount of solid metals during the process of the solid route becomes zero. The presence of solid metal comprising particles can easily be detected by visual inspection at least if the diameter of the solid particles in which the metals are comprised is larger than the wavelength of visible light. Of course, methods such as quasi-elastic light scattering (QELS) or near forward scattering which are known to the skilled person can also be used to ensure that in no point in time of the process of the solid route, all metals are in the solute state.

The protic liquid to be applied in the solid or solution route of this invention for preparing catalyst can be any protic liquid. Examples include water, carboxylic acids, and alcohols such as methanol or ethanol. Preferably, a liquid comprising water such as mixtures of an alcohol and water and more preferably water is used as protic liquid in this solid route. Also different protic liquids can be applied simultaneously in the solid route. For instance, it is possible to add a suspension of a metal component in ethanol to an aqueous solution of another metal component.

The Group VIB metal generally comprises chromium, molybdenum, tungsten, or mixtures thereof. Suitable Group VIII non-noble metals are, e.g., iron, cobalt, nickel, or mixtures thereof. Preferably, a combination of metal components comprising nickel, molybdenum and tungsten or nickel, cobalt, molybdenum and tungsten is applied in the process of the solid route. If the protic liquid is water, suitable nickel components which are at least partly in the solid state during contacting comprise water-insoluble nickel components such as nickel carbonate, nickel hydroxide, nickel phosphate, nickel phosphite, nickel formate, nickel sulfide, nickel molybdate, nickel tungstate, nickel oxide, nickel alloys such as nickel-molybdenum alloys, Raney nickel, or mixtures thereof. Suitable molybdenum components, which are at least partly in the solid state during contacting, comprise water-insoluble molybdenum components such as molybdenum (di- and tri) oxide, molybdenum carbide, molybdenum nitride, aluminum molybdate, molybdic acid (e.g. $H_2MoO_4$), molybdenum sulfide, or mixtures thereof. Finally, suitable tungsten components which are at least partly in the solid state during contacting comprise tungsten di- and trioxide, tungsten sulfide ($WS_2$ and $WS_3$), tungsten carbide, tungstic acid, tungsten nitride, aluminum tungstate (also meta-, or polytungstate) or mixtures thereof. These components are generally commercially available or can be prepared by, e.g., precipitation. e.g., nickel carbonate can be prepared from a nickel chloride, sulfate, or nitrate solution by adding an appropriate amount of sodium carbonate. It is generally known to the skilled person to choose the precipitation conditions in such a way as to obtain the desired morphology and texture.

In general, metal components, which mainly contain C, O, and/or H besides the metal, are preferred because they are less detrimental to the environment. Nickel carbonate is a preferred metal component to be added at least partly in the solid state because when nickel carbonate is applied, $CO_2$ evolves and positively influences the pH of the reaction mixture. Further, due to the transformation of carbonate into $CO_2$, the carbonate does not end up in the wastewater.

Preferred nickel components which are added in the solute state are water-soluble nickel components, e.g. nickel nitrate, nickel sulfate, nickel acetate, nickel chloride, or mixtures thereof. Preferred molybdenum and tungsten components which are added in the solute state are water-soluble molybdenum and tungsten components such as alkali metal or ammonium molybdate (also peroxo-, di-, tri-, tetra-, hepta-, octa-, or tetradecamolybdate), Mo—P heteropolyanion compounds, Wo—Si heteropolyanion compounds, W—P heteropolyanion compounds, W—Si heteropolyanion compounds, Ni—Mo—W heteropolyanion compounds, Co—Mo—W heteropolyanion compounds, alkali metal or ammonium tungstates (also meta-, para-, hexa-, or polytungstate), or mixtures thereof.

Preferred combinations of metal components are nickel carbonate, tungstic acid and molybdenum oxide. Another preferred combination is nickel carbonate, ammonium dimolybdate and ammonium metatungstate. It is within the scope of the skilled person to select further suitable combinations of metal components. It must be noted that nickel carbonate always comprises a certain amount of hydroxy-groups. It is preferred that the amount of hydroxy-groups present in the nickel carbonate be high.

An alternative method of preparing the catalysts used in the practice of the present invention is to prepare the bulk catalyst composition by a process comprising reacting in a reaction mixture a Group VIII non-noble metal component in solution and a Group VIB metal component in solution to obtain a precipitate.

As in the case of the solid route, preferably, one Group VIII non-noble metal component is reacted with two Group VIB metal components. The molar ratio of Group VIB metals to Group VIII non-noble metals applied in the process of the solution route is preferably the same as described for the solid route. Suitable Group VIB and Group VIII non-noble metal components are, e.g., those water-soluble nickel, molybdenum and tungsten components described above for the solid route. Further Group VIII non-noble metal components are, e.g., cobalt or iron components. Further Group VIB metal components are, e.g. chromium components. The metal components can be added to the reaction mixture in solution, suspension or as such. If soluble salts are added as such, they will dissolve in the reaction mixture and subsequently be precipitated. Suitable Group VIB metal salts which are soluble in water are ammonium salts such as ammonium dimolybdate, ammonium tri-, tetra-hepta-, octa-, and tetradeca-molybdate, ammonium para-, meta-, hexa-, and polytungstate, alkali metal salts, silicic acid salts of Group VIB metals such as molybdic silicic acid, molybdic silicic tungstic acid, tungstic acid, metatungstic acid, pertungstic acid, heteropolyanion compounds of Mo—P, Mo—Si, W—P, and W—Si. It is also possible to add Group VIB metal-containing compounds which are not in solution at the time of addition, but where solution is effected in the reaction mixture. Examples of these compounds are metal compounds which contain so much crystal water that upon temperature increase they will dissolve in their own metal water. Further, non-soluble metal salts may be added in suspension or as such, and solution is effected in the reaction mixture. Suitable non-soluble metals salts are heteropolyanion compounds of Co—Mo—W (moderately soluble in cold water), heteropolyanion compounds of Ni—Mo—W (moderately soluble in cold water).

The reaction mixture is reacted to obtain a precipitate. Precipitation is effected by adding a Group VIII non-noble metal salt solution at a temperature and pH at which the Group VIII non-noble metal and the Group VIB metal precipitate, adding a compound which complexes the metals and releases the metals for precipitation upon temperature increase or pH change or adding a Group VIB metal salt solution at a temperature and pH at which the Group VIII non-noble metal and Group VIB metal precipitate, changing the temperature, changing the pH, or lowering the amount of the solvent. The precipitate obtained with this process appears to have high catalytic activity. In contrast to the conventional hydroprocessing catalysts, which usually comprise a carrier impregnated with Group VIII non-noble metals and Group VIB metals, said precipitate can be used without a support. Unsupported catalyst compositions are usually referred to as bulk catalysts. Changing the pH can be done by adding base or acid to the reaction mixture, or adding compounds, which decompose upon temperature, increase into hydroxide ions or $H^+$ ions that respectively increase or decrease the pH. Examples of compounds that decompose upon temperature increase and thereby increase or decrease the pH are urea, nitrites, ammonium cyanate, ammonium hydroxide, and ammonium carbonate.

In an illustrative process according to the solution route, solutions of ammonium salts of a Group VIB metal are made and a solution of a Group VIII non-noble metal nitrate is made. Both solutions are heated to a temperature of approximately 90° C. Ammonium hydroxide is added to the Group VIB metal solution. The Group VIII non-noble metal solution is added to the Group VIB metal solution and direct precipitation of the Group VIB and Group VIII non-noble metal components occurs. This process can also be conducted at lower temperature and/or decreased pressure or higher temperature and/or increased pressure.

In another illustrative process according to the solution route, a Group VIB metal salt, a Group VIII metal salt, and ammonium hydroxide are mixed in solution together and heated so that ammonia is driven off and the pH is lowered to a pH at which precipitation occurs. For instance when nickel, molybdenum, and tungsten components are applied, precipitation typically occurs at a pH below 7.

The bulk catalyst composition can generally be directly shaped into hydroprocessing particles. If the amount of liquid of the bulk catalyst composition is so high that it cannot be directly subjected to a shaping step, a solid liquid separation can be performed before shaping. Optionally the bulk catalyst composition, either as such or after solid liquid separation, can be calcined before shaping.

If desired, further materials can be added in addition to the metal components already added. These materials include any material that is added during conventional hydroprocessing catalyst preparation. Suitable examples are phosphorus compounds, boron compounds, fluorine-containing compounds, additional transition metals, rare earth metals, fillers, or mixtures thereof.

Suitable additional transition metals are, e.g., rhenium, ruthenium, rhodium, iridium, chromium, vanadium, iron, cobalt, platinum, palladium, cobalt, nickel, molybdenum, or tungsten. Nickel, molybdenum, and tungsten can be applied in the form of any of the water-insoluble nickel, molybdenum and/or tungsten components that are described above for the solid route. These metals can be added at any stage of the process of the present invention prior to the shaping step. Apart from adding these metals during the process of the invention, it is also possible to composite the final catalyst composition therewith. It is, e.g., possible to impregnate the final catalyst composition with an impregnation solution comprising any of these metals.

The processes of the present invention for preparing the bulk catalyst compositions may further comprise a sulfidation step. Sulfidation is generally carried out by contacting the catalyst composition or precursors thereof with a sulfur containing compound such as elementary sulfur, hydrogen sulfide or polysulfides. The sulfidation can generally be carried out subsequently to the preparation of the bulk catalyst composition but prior to the addition of a binder material, and/or subsequently to the addition of the binder material but prior to subjecting the catalyst composition to spray drying and/or any alternative method, and/or subsequently to subjecting the composition to spray drying and/or any alternative method but prior to shaping, and/or subsequently to shaping the catalyst composition. It is preferred that the sulfidation is not carried out prior to any process step that reverts the obtained metal sulfides into their oxides. Such process steps are, e.g., calcination or spray drying or any other high temperature treatment in the presence of oxygen. Consequently, if the catalyst composition is subjected to spray drying and/or any alternative technique, the sulfidation should be carried out subsequent to the application of any of these methods.

Additionally to, or instead of, a sulfidation step, the bulk catalyst composition may be prepared from at least one metal sulfide. If, e.g., the solid route is applied the bulk catalyst component can be prepared form nickel sulfide and/or molybdenum sulfide and/or tungsten sulfide.

Catalyst with Additional Unsaturation—Another aspect described herein relates to a catalyst precursor composition comprising at least one metal from Group 6 of the Periodic Table of the Elements, at least one metal from Groups 8-10 of the Periodic Table of the Elements, and a reaction product formed from (i) a first organic compound containing at least one amine group, or (ii) a second organic compound separate from said first organic compound and containing at least one carboxylic acid group, but not both (i) and (ii). When this reaction product contains additional unsaturation(s) not present in the first or second organic compounds, e.g., from at least partial decomposition/dehydrogenation at conditions including elevated temperatures, the presence of the additional unsaturation(s) in any intermediate or final composition can be determined by methods well known in the art, e.g., by FTIR and/or nuclear magnetic resonance ($^{13}C$ NMR) techniques. This catalyst precursor composition can be a bulk metal catalyst precursor composition or a heterogeneous (supported) metal catalyst precursor composition.

More broadly, this aspect of the present invention relates to a catalyst precursor composition comprising at least one metal from Group 6 of the Periodic Table of the Elements, at least one metal from Groups 8-10 of the Periodic Table of the Elements, and a decomposition/dehydrogenation reaction product formed from at least partial decomposition of (i) a first organic compound containing at least one first functional group or (ii) a second organic compound separate from said first organic compound and containing at least one second functional group, but not both (i) and (ii), which decomposition/dehydrogenation reaction causes an additional unsaturation to form in situ in the reaction product.

When the catalyst precursor is a bulk mixed metal catalyst precursor composition, the reaction product can be obtained by heating the composition (though specifically the first or second organic compounds, or the amine-containing or carboxylic acid-containing compound) to a temperature from about 195° C. to about 250° C. for a time sufficient to effectuate a dehydrogenation, and/or an at least partial decomposition, of the first or second organic compound to form an additional unsaturation in the reaction product in situ. Accordingly, a bulk mixed metal hydroprocessing catalyst composition can be produced from this bulk mixed metal catalyst precursor composition by sulfiding it under sufficient sulfiding conditions, which sulfiding should begin in the presence of the in situ additionally unsaturated reaction product (which may result from at least partial decomposition, e.g., via oxidative dehydrogenation in the presence of oxygen and/or via non-oxidative dehydrogenation in the absence of an appropriate concentration of oxygen, of typically-unfunctionalized organic portions of the first or second organic compounds, e.g., of an aliphatic portion of an organic compound and/or through conjugation/aromatization of unsaturations expanding upon an unsaturated portion of an organic compound).

Catalyst precursor compositions and hydroprocessing catalyst compositions useful in various aspects of the present invention can advantageously comprise (or can have metal components that consist essentially of) at least one metal from Group 6 of the Periodic Table of Elements and at least one metal from Groups 8-10 of the Periodic Table of Elements, and optionally at least one metal from Group 5 of the Periodic Table of Elements. Generally, these metals are present in their substantially fully oxidized form, which can typically take the form of simple metal oxides, but which may be present in a variety of other oxide forms, e.g., such as hydroxides, oxyhydroxides, oxycarbonates, carbonates, oxynitrates, oxysulfates, or the like, or some combination to thereof. In one preferred embodiment, the Group 6 metal(s) can be Mo and/or W, and the Group 8-10 metal(s) can be Co and/or Ni. Generally, the atomic ratio of the Group 6 metal(s) to the metal(s) of Groups 8-10 can be from about 2:1 to about 1:3, for example from about 5:4 to about 1:2, from about 5:4 to about 2:3, from about 5:4 to about 3:4, from about 10:9 to about 1:2, from about 10:9 to about 2:3, from about 10:9 to about 3:4, from about 20:19 to about 2:3, or from about 20:19 to about 3:4. When the composition further comprises at least one metal from Group 5, that at least one metal can be V and/or Nb. When present, the amount of Group 5 metal(s) can be such that the atomic ratio of the Group 6 metal(s) to the Group 5 metal(s) can be from about 99:1 to about 1:1, for example from about 99:1 to about 5:1, from about 99:1 to about 10:1, or from about 99:1 to about 20:1. Additionally or alternately, when Group 5 metal(s) is(are) present, the atomic ratio of the sum of the Group 5 metal(s) plus the Group (6) metal(s) compared to the metal(s) of Groups 8-10 can be from about 2:1 to about 1:3, for example from about 5:4 to about 1:2, from about 5:4 to about 2:3, from about 5:4 to about 3:4, from about 10:9 to about 1:2, from about 10:9 to about 2:3, from about 10:9 to about 3:4, from about 20:19 to about 2:3, or from about 20:19 to about 3:4.

As used herein, the numbering scheme for the Periodic Table Groups is as disclosed in *Chemical and Engineering News*, 63(5), 27 (1985).

The metals in the catalyst precursor compositions and in the hydroprocessing catalyst compositions according to the invention can be present in any suitable form prior to sulfiding, but can often be provided as metal oxides. When provided as bulk mixed metal oxides, such bulk oxide components of the catalyst precursor compositions and of the hydroprocessing catalyst compositions according to the invention can be prepared by any suitable method known in the art, but can generally be produced by forming a slurry, typically an aqueous slurry, comprising (1) (a) an oxyanion of the Group 6 metal(s), such as a tungstate and/or a molybdate, or (b) an insoluble (oxide, acid) form of the Group 6 metal(s), such as tungstic acid and/or molybdenum trioxide, (2) a salt of the Group 8-10 metal(s), such as nickel carbonate, and optionally, when present, (3) (a) a salt or oxyanion of a Group 5 metal, such as a vanadate and/or a niobate, or (b) insoluble (oxide, acid) form of a Group 5 metal, such as niobic acid and/or diniobium pentoxide. The slurry can be heated to a suitable temperature, such as from about 60° C. to about 10 to 150° C., at a suitable pressure, e.g., at atmospheric or autogenous pressure, for an appropriate time, e.g., about 4 hours to about 24 hours.

Non-limiting examples of suitable mixed metal oxide compositions can include, but are not limited to, nickel-tungsten oxides, cobalt-tungsten oxides, nickel-molybdenum oxides, cobalt-molybdenum oxides, nickel-molybdenum-tungsten oxides, cobalt-molybdenum-tungsten oxides, cobalt-nickel-tungsten oxides, cobalt-nickel-molybdenum oxides, cobalt-nickel-tungsten-molybdenum oxides, nickel-tungsten-niobium oxides, nickel-tungsten-vanadium oxides, cobalt-tungsten-vanadium oxides, cobalt-tungsten-niobium oxides, nickel-molybdenum-niobium oxides, nickel-molybdenum-vanadium oxides, nickel-molybdenum-tungsten-niobium oxides, nickel-molybdenum-tungsten-vanadium oxides, and the like, and combinations thereof.

Suitable mixed metal oxide compositions can advantageously exhibit a specific surface area (as measured via the nitrogen BET method using a Quantachrome Autosorb™ apparatus) of at least about 20 m²/g, for example at least about 30 m²/g, at least about 40 m²/g, at least about 50 m²/g, at least about 60 m²/g, at least about 70 m²/g, or at least about 80 m²/g. Additionally or alternately, the mixed metal oxide compositions can exhibit a specific surface area of not more than about 500 m²/g, for example not more than about 400 m²/g, not more than about 300 m²/g, not more than about 250 m²/g, not more than about 200 m²/g, not more than about 175 m²/g, not more than about 150 m²/g, not more than about 125 m²/g, or not more than about 100 m²/g.

After separating and drying the mixed metal oxide (slurry) composition, it can be treated, generally by impregnation, with (i) an effective amount of a first organic compound containing at least one amine group or (ii) an effective amount of a second organic compound separate from the first organic compound and containing at least one carboxylic acid group, but not both (i) and (ii).

In an embodiment of any of the compositions and/or processes described herein, the first organic compound can comprise at least 10 carbon atoms, for example can comprise from 10 to 20 carbon atoms or can comprise a primary monoamine having from 10 to 30 carbon atoms. Additionally or alternately, the second organic compound can comprise at least 10 carbon atoms, for example can comprise from 10 to 20 carbon atoms or can comprise only one carboxylic acid group and can have from 10 to 30 carbon atoms.

Representative examples of organic compounds containing amine groups can include, but are not limited to, primary and/or secondary, linear, branched, and/or cyclic amines, such as triacontanylamine, octacosanylamine, hexacosanylamine, tetracosanylamine, docosanylamine, erucylamine, eicosanylamine, octadecylamine, oleylamine, linoleylamine, hexadecylamine, sapienylamine, palmitoleylamine, tetradecylamine, myristoleylamine, dodecylamine, decylamine, nonylamine, cyclooctylamine, octylamine, cycloheptylamine, heptylamine, cyclohexylamine, n-hexylamine, isopentylamine, n-pentylamine, t-butylamine, n-butylamine, isopropylamine, n-propylamine, adamantanamine, adamantanemethylamine, pyrrolidine, piperidine, piperazine, imidazole, pyrazole, pyrrole, pyrrolidine, pyrroline, indazole, indole, carbazole, norbornylamine, aniline, pyridylamine, benzylamine, aminotoluene, alanine, arginine, aspartic acid, glutamic acid, glutamine, glycine, histidine, isoleucine, leucine, lysine, phenylalanine, serine, threonine, valine, 1-amino-2-propanol, 2-amino-1-propanol, diaminoeicosane, diaminooctadecane, diaminohexadecane, diaminotetradecane, diaminododecane, diaminodecane, 1,2-diaminocyclohexane, 1,3-diaminocyclohexane, 1,4-diaminocyclohexane, ethylenediamine, ethanolamine, p-phenylenediamine, o-phenylenediamine, m-phenylenediamine, 1,2-propylenediamine, 1,3-propylenediamine, 1,4-diaminobutane, 1,3 diamino-2-propanol, and the like, and combinations thereof. In an embodiment, the molar ratio of the Group 6 metal(s) in the composition to the first organic compound during treatment can be from about 1:1 to about 20:1.

The amine functional group from the first organic compound can include primary or secondary amines, as mentioned above, but generally does not include quaternary amines, and in some instances does not include tertiary amines either. Furthermore, the first organic compound can optionally contain other functional groups besides amines. For instance, the first organic compound can comprise an aminoacid, which possesses an amine functional group and a carboxylic acid functional group simultaneously. Aside from carboxylic acids, other examples of such secondary functional groups in amine-containing organic compounds can generally include, but are not limited to, hydroxyls, aldehydes, anhydrides, ethers, esters, imines, imides, ketones, thiols (mercaptans), thioesters, and the like, and combinations thereof.

Additionally or alternately, the amine portion of the first organic compound can be a part of a larger functional group in that compound, so long as the amine portion (notably the amine nitrogen and the constituents attached thereto) retains its operability as a Lewis base. For instance, the first organic compound can comprise a urea, which functional group comprises an amine portion attached to the carbonyl portion of an amide group. In such an instance, the urea can be considered functionally as an "amine-containing" functional group for the purposes of the present invention herein, except in situations where such inclusion is specifically contradicted. Aside from ureas, other examples of such amine-containing functional groups that may be suitable for satisfying the at least one amine group in the first organic compound can generally include, but are not limited to, hydrazides, sulfonamides, and the like, and combinations thereof.

Representative examples of organic compounds containing carboxylic acids can include, but are not limited to, primary and/or secondary, linear, branched, and/or cyclic amines, such as triacontanoic acid, octacosanoic acid, hexacosanoic acid, tetracosanoic acid, docosanoic acid, erucic acid, docosahexanoic acid, eicosanoic acid, eicosapentanoic acid, arachidonic acid, octadecanoic acid, oleic acid, elaidic acid, stearidonic acid, linoleic acid, alpha-linolenic acid, hexadecanoic acid, sapienic acid, palmitoleic acid, tetradecanoic acid, myristoleic acid, dodecanoic acid, decanoic acid, nonanoic acid, cyclooctanoic acid, octanoic acid, cycloheptanoic acid, heptanoic acid, cyclohexanoic acid, hexanoic acid, adamantanecarboxylic acid, norbornaneacetic acid, benzoic acid, salicylic acid, acetylsalicylic acid, citric acid, maleic acid, malonic acid, glutaric acid, lactic acid, oxalic acid, tartaric acid, cinnamic acid, vanillic acid, succinic acid, adipic acid, phthalic acid, isophthalic acid, terephthalic acid, ethylenediaminetetracarboxylic acids (such as EDTA), fumaric acid, alanine, arginine, aspartic acid, glutamic acid, glutamine, glycine, histidine, isoleucine, leucine, lysine, phenylalanine, serine, threonine, valine, 1,2-cyclohexanedicarboxylic acid, 1,3-cyclohexanedicarboxylic acid, 1,4-cyclohexanedicarboxylic acid, and the like, and combinations thereof. In an embodiment, the molar ratio of the Group 6 metal(s) in the composition to the second organic compound during treatment can be from about 3:1 to about 20:1.

The second organic compound can optionally contain other functional groups besides carboxylic acids. For instance, the second organic compound can comprise an aminoacid, which possesses a carboxylic acid functional group and an amine functional group simultaneously. Aside from amines, other examples of such secondary functional groups in carboxylic acid-containing organic compounds can generally include, but are not limited to, hydroxyls, aldehydes, anhydrides, ethers, esters, imines, imides, ketones, thiols (mercaptans), thioesters, and the like, and combinations thereof. In some embodiments, the second organic compound can contain no additional amine or alcohol functional groups in addition to the carboxylic acid functional group(s).

Additionally or alternately, the reactive portion of the second organic compound can be a part of a larger functional group in that compound and/or can be a derivative of a carboxylic acid that behaves similarly enough to a carboxylic acid, such that the reactive portion and/or derivative retains its operability as a Lewis acid. One example of a carboxylic acid derivative can include an alkyl carboxylate ester, where the alkyl group does not substantially hinder (over a reasonable time scale) the Lewis acid functionality of the carboxylate portion of the functional group.

In certain embodiments, the organic compound(s)/additive(s) and/or the reaction product(s) are not located/incorporated within the crystal lattice of the mixed metal oxide precursor composition, e.g., instead being located on the surface and/or within the pore volume of the precursor composition and/or being associated with (bound to) one or more metals or oxides of metals in a manner that does not significantly affect the crystalline lattice of the mixed metal oxide precursor composition, as observed through XRD and/or other crystallographic spectra. It is noted that, in these certain embodiments, a sulfided version of the mixed metal oxide precursor composition can still have its sulfided form affected by the organic compound(s)/additive(s) and/or the reaction product(s), even though the oxide lattice is not significantly affected.

One way to attain a catalyst precursor composition containing a decomposition/dehydrogenation reaction product, such as one containing additional unsaturations, includes:

(a) treating a catalyst precursor composition, which comprises at least one metal from Group 6 of the Periodic Table of the Elements and at least one metal from Groups 8-10 of the Periodic Table of the Elements, with a first organic compound containing at least one amine group or a second organic compound separate from said first organic compound and containing at least one carboxylic acid group, but not both, to form an organically treated precursor catalyst composition; and (b) heating the organically treated precursor catalyst composition at a temperature sufficient and for a time sufficient for the first or second organic compounds to react to form an in situ product containing additional unsaturation (for example, depending upon the nature of the first or second organic compound, the temperature can be from about 195° C. to about 250° C., such as from about 200° C. to about 230° C.), thereby forming the additionally-unsaturated catalyst precursor composition.

In certain advantageous embodiments, the heating step (b) above can be conducted for a sufficiently long time so as to form additional unsaturation(s), which may result from at least partial decomposition (e.g., oxidative and/or non-oxidative dehydrogenation and/or aromatization) of some (typically-unfunctionalized organic) portions of the first or second organic compounds, but generally not for so long that the at least partial decomposition volatilizes more than 50% by weight of the first or second organic compounds. Without being bound by theory, it is believed that additional unsaturation(s) formed in situ and present at the point of sulfiding the catalyst precursor composition to form a sulfided (hydroprocessing) catalyst composition can somehow assist in controlling one or more of the following: the size of sulfided crystallites; the coordination of one or more of the metals during sulfidation, such that a higher proportion of the one or more types of metals are in appropriate sites for promoting desired hydroprocessing reactions (such as hydrotreating, hydrodenitrogenation, hydrodesulfurization, hydrodeoxygenation, hydrodemetallation, hydrocracking including selective hydrocracking, hydroisomerization, hydrodewaxing, and the like, and combinations thereof, and/or for reducing/minimizing undesired hydroprocessing reactions, such as aromatic saturation, hydrogenation of double bonds, and the like, and combinations thereof) than for sulfided catalysts made in the absence of the in situ formed reaction product having additional unsaturation(s); and coordination/catalysis involving one or more of the metals after sulfidation, such that a higher proportion (or each) of the one or more types of metals are more efficient at promoting desired hydroprocessing reactions (e.g., because the higher proportion of metal sites can catalyze more hydrodesulfurization reactions of the same type in a given timescale and/or because the higher proportion of the metal sites can catalyze more difficult hydrodesulfurization reactions in a similar timescale) than for sulfided catalysts made in the absence of the in situ formed reaction product having additional unsaturation(s).

When used to make a bulk mixed metal catalyst precursor composition, the in situ reacted catalyst precursor composition can, in one embodiment, consist essentially of the reaction product, an oxide form of the at least one metal from Group 6, an oxide form of the at least one metal from Groups 8-10, and optionally about 20 wt % or less of a binder (e.g., about 10 wt % or less).

After treatment of the catalyst precursor containing the at least one Group 6 metal and the at least one Group 8-10 metal with the first or second organic compounds, the organically treated catalyst precursor composition can be heated to a temperature high enough to form the reaction product and optionally but preferably high enough to enable any dehydrogenation/decomposition byproduct to be easily removed (e.g., in order to drive the reaction equilibrium to the at least partially dehydrogenated/decomposed product). Additionally or alternately, the organically treated catalyst precursor composition can be heated to a temperature low enough so as to substantially retain the reaction product (containing the additional unsaturations), so as not to significantly decompose the reaction product, and/or so as not to significantly volatilize (more than 50% by weight of) the first or second organic compounds (whether reacted or not).

It is contemplated that the specific lower and upper temperature limits based on the above considerations can be highly dependent upon a variety of factors that can include, but are not limited to, the atmosphere under which the heating is conducted, the chemical and/or physical properties of the first organic compound, the second organic compound, the reaction product, and/or any reaction byproduct, or a combination thereof. In one embodiment, the heating temperature can be at least about 120° C., for example at least about 150° C., at least about 165° C., at least about 175° C., at least about 185° C., at least about 195° C., at least about 200° C., at least about 210° C., at least about 220° C., at least about 230° C., at least about 240° C., or at least about 250° C. Additionally or alternately, the heating temperature can be not greater than about 400° C., for example not greater than about 375° C., not greater than about 350° C., not greater than about 325° C., not greater than about 300° C., not greater than about 275° C., not greater than about 250° C., not greater than about 240° C., not greater than about 230° C., not greater than about 220° C., not greater than about 210° C., or not greater than about 200° C.

In one embodiment, the heating can be conducted in a low- or non-oxidizing atmosphere (and conveniently in an inert atmosphere, such as nitrogen). In an alternate embodiment, the heating can be conducted in a moderately- or highly-oxidizing environment. In another alternate embodiment, the heating can include a multi-step process in which one or more heating steps can be conducted in the low- or non-oxidizing atmosphere, in which one or more heating steps can be conducted in the moderately- or highly-oxidizing environment, or both. Of course, the period of time for the heating in the environment can be tailored to the first or second organic compound, but can typically extend from about 5 minutes to about 168 hours, for example from about 10 minutes to about 96 hours, from about 10 minutes to about 48 hours, from about 10 minutes to about 24 hours, from about 10 minutes to about 18 hours, from about 10 minutes to about 12 hours, from about 10 minutes to about 8 hours, from about 10 minutes to about 6 hours, from about 10 minutes to about 4 hours, from about 20 minutes to about 96 hours, from about 20 minutes to about 48 hours, from about 20 minutes to about 24 hours, from about 20 minutes to about 18 hours, from about 20 minutes to about 12 hours, from about 20 minutes to about 8 hours, from about 20 minutes to about 6 hours, from about 20 minutes to about 4 hours, from about 30 minutes to about 96 hours, from about 30 minutes to about 48 hours, from about 30 minutes to about 24 hours, from about 30 minutes to about 18 hours, from about 30 minutes to about 12 hours, from about 30 minutes to about 8 hours, from about 30 minutes to about 6 hours, from about 30 minutes to about 4 hours, from about 45 minutes to about 96 hours, from about 45 minutes to about 48 hours, from about 45 minutes to about 24 hours, from about 45 minutes to about 18 hours, from about 45 minutes to about 12 hours, from about 45 minutes to about 8 hours, from about 45 minutes to about 6 hours, from about 45 minutes to about 4 hours, from about 1 hour to about 96 hours, from about 1 hour to about 48 hours, from about 1 hour to about 24 hours, from about 1 hour to about 18 hours, from about 1 hour to about 12 hours, from about 1 hour to about 8 hours, from 1 hour minutes to about 6 hours, or from about 1 hour to about 4 hours.

In an embodiment, the organically treated catalyst precursor composition and/or the catalyst precursor composition containing the reaction product can contain from about 4 wt % to about 20 wt %, for example from about 5 wt % to about 15 wt %, carbon resulting from the first and second organic compounds and/or from the condensation product, as applicable, based on the total weight of the relevant composition.

Additionally or alternately, as a result of the heating step, the reaction product from the organically treated catalyst precursor can exhibit a content of unsaturated carbon atoms (which includes aromatic carbon atoms), as measured according to peak area comparisons using $^{13}C$ NMR techniques, of at least 29%, for example at least about 30%, at least about 31%, at least about 32%, or at least about 33%. Further additionally or alternately, the reaction product from the organically treated catalyst precursor can optionally exhibit a content of unsaturated carbon atoms (which includes aromatic carbon atoms), as measured according to peak area comparisons using $^{13}C$ NMR techniques, of up to about 70%, for example up to about 65%, up to about 60%, up to about 55%, up to about 50%, up to about 45%, up to about 40%, or up to about 35%. Still further additionally or alternately, as a result of the heating step, the reaction product from the organically treated catalyst precursor can exhibit an increase in content of unsaturated carbon atoms (which includes aromatic carbon atoms), as measured according to peak area comparisons using $^{13}C$ NMR techniques, of at least about 17%, for example at least about 18%, at least about 19%, at least about 20%, or at least about 21% (e.g., in an embodiment where the first organic compound is oleylamine and the second organic compound is oleic acid, such that the combined unsaturation level of the unreacted compounds is about 11.1% of carbon atoms, a ~17% increase in unsaturated carbons upon heating corresponds to about 28.1% content of unsaturated carbon atoms in the reaction product). Yet further additionally or alternately, the reaction product from the organically treated catalyst precursor can optionally exhibit an increase in content of unsaturated carbon atoms (which includes aromatic carbon atoms), as measured according to peak area comparisons using $^{13}C$ NMR techniques, of up to about 60%, for example up to about 55%, up to about 50%, up to about 45%, up to about 40%, up to about 35%, up to about 30%, or up to about 25%.

Again further additionally or alternately, as a result of the heating step, the reaction product from the organically treated catalyst precursor can exhibit a ratio of unsaturated carbon atoms to aromatic carbon atoms, as measured according to peak area ratios using infrared spectroscopic techniques of a deconvoluted peak centered from about 1700 $cm^{-1}$ to about 1730 $cm^{-1}$ (e.g., at about 1715 $cm^{-1}$), compared to a deconvoluted peak centered from about 1380 $cm^{-1}$ to about 1450 $cm^{-1}$ (e.g., from about 1395 $cm^{-1}$ to about 1415 $cm^{-1}$), of at least 0.9, for example at least 1.0, at least 1.1, at least 1.2, at least 1.3, at least 1.4, at least 1.5, at least 1.7, at least 2.0, at least 2.2, at least 2.5, at least 2.7, or at least 3.0. Again still further additionally or alternately, the reaction product from the organically treated catalyst precursor can exhibit a ratio of unsaturated carbon atoms to aromatic carbon atoms, as measured according to peak area ratios using infrared spectroscopic techniques of a deconvoluted peak centered from about 1700 cm$^{-1}$ to about 1730 cm$^{-1}$ (e.g., at about 1715 cm$^{-1}$), compared to a deconvoluted peak centered from about 1380 cm$^{-1}$ to about 1450 cm$^{-1}$ (e.g., from about 1395 cm$^{-1}$ to about 1415 cm$^{-1}$), of up to 15, for example up to 10, up to 8.0, up to 7.0, up to 6.0, up to 5.0, up to 4.5, up to 4.0, up to 3.5, or up to 3.0.

A (sulfided) hydroprocessing catalyst composition can then be produced by sulfiding the catalyst precursor composition containing the reaction product. Sulfiding is generally carried out by contacting the catalyst precursor composition containing the reaction product with a sulfur-containing compound (e.g., elemental sulfur, hydrogen sulfide, polysulfides, or the like, or a combination thereof, which may originate from a fossil/mineral oil stream, from a biocomponent-based oil stream, from a combination thereof, or from a sulfur-containing stream separate from the aforementioned oil stream(s)) at a temperature and for a time sufficient to substantially sulfide the composition and/or sufficient to render the sulfided composition active as a hydroprocessing catalyst. For instance, the sulfidation can be carried out at a temperature from about 300° C. to about 400° C., e.g., from about 310° C. to about 350° C., for a period of time from about 30 minutes to about 96 hours, e.g., from about 1 hour to about 48 hours or from about 4 hours to about 24 hours. The sulfiding can generally be conducted before or after combining the metal (oxide) containing composition with a binder, if desired, and before or after forming the composition into a shaped catalyst. The sulfiding can additionally or alternately be conducted in situ in a hydroprocessing reactor. Obviously, to the extent that a reaction product of the first or second organic compounds contains additional unsaturations formed in situ, it would generally be desirable for the sulfidation (and/or any catalyst treatment after the organic treatment) to significantly maintain the in situ formed additional unsaturations of said reaction product.

The sulfided catalyst composition can exhibit a layered structure comprising a plurality of stacked YS$_2$ layers, where Y is the Group 6 metal(s), such that the average number of stacks (typically for bulk organically treated catalysts) can be from about 1.5 to about 3.5, for example from about 1.5 to about 3.0, from about 2.0 to about 3.3, from about 2.0 to about 3.0, or from about 2.1 to about 2.8. For instance, the treatment of the metal (oxide) containing precursor composition according to the invention can afford a decrease in the average number of stacks of the treated precursor of at least about 0.8, for example at least about 1.0, at least about 1.2, at least about 1.3, at least about 1.4, or at least about 1.5, as compared to an untreated metal (oxide) containing precursor composition. As such, the number of stacks can be considerably less than that obtained with an equivalent sulfided mixed metal (oxide) containing precursor composition produced without the first or second organic compound treatment. The reduction in the average number of stacks can be evidenced, e.g., via X-ray diffraction spectra of relevant sulfided compositions, in which the (002) peak appears significantly broader (as determined by the same width at the half-height of the peak) than the corresponding peak in the spectrum of the sulfided mixed metal (oxide) containing precursor composition produced without the organic treatment (and/or, in certain cases, with only a single organic compound treatment using an organic compound having less than 10 carbon atoms) according to the present invention. Additionally or alternately to X-ray diffraction, transmission electron microscopy (TEM) can be used to obtain micrographs of relevant sulfided compositions, including multiple microcrystals, within which micrograph images the multiple microcrystals can be visually analyzed for the number of stacks in each, which can then be averaged over the micrograph visual field to obtain an average number of stacks that can evidence a reduction in average number of stacks compared to a sulfided mixed metal (oxide) containing precursor composition produced without the organic treatment (and/or, in certain cases, with only a single organic compound treatment) according to the present invention.

If a binder material is used in the preparation of the catalyst composition it can be any material that is conventionally applied as a binder in hydroprocessing catalysts. Examples include silica, silica-alumina, such as conventional silica-alumina, silica-coated alumina and alumina-coated silica, alumina such as (pseudo) boehmite, or gibbsite, titania, zirconia, cationic clays or anionic clays such as saponite, bentonite, kaoline, sepiolite or hydrotalcite, or mixtures thereof. Preferred binders are silica, silica-alumina, alumina, titanic, zirconia, or mixtures thereof. These binders may be applied as such or after peptization. It is also possible to apply precursors of these binders that, during the process of the invention are converted into any of the above-described binders. Suitable precursors are, e.g., alkali metal aluminates (to obtain an alumina binder), water glass (to obtain a silica binder), a mixture of alkali metal aluminates and water glass (to obtain a silica alumina binder), a mixture of sources of a di-, tri-, and/or tetravalent metal such as a mixture of water-soluble salts of magnesium, aluminum and/or silicon (to prepare a cationic clay and/or anionic clay), chlorohydrol, aluminum sulfate, or mixtures thereof.

If desired, the binder material may be composited with a Group VIB metal and/or a Group VIII non-noble metal, prior to being composited with the bulk catalyst composition and/or prior to being added during the preparation thereof. Compositing the binder material with any of these metals may be carried out by impregnation of the solid binder with these materials. The person skilled in the art knows suitable impregnation techniques. If the binder is peptized, it is also possible to carry out the peptization in the presence of Group VIB and/or Group VIII non-noble metal components.

If alumina is applied as binder, the surface area preferably lies in the range of 100-400 m$^2$/g, and more preferably 150-350 m$^2$/g, measured by the B.E.T. method. The pore volume of the alumina is preferably in the range of 0.5-1.5 ml/g measured by nitrogen adsorption.

Generally, the binder material to be added in the process of the invention has less catalytic activity than the bulk catalyst composition or no catalytic activity at all. Consequently, by adding a binder material, the activity of the bulk catalyst composition may be reduced. Therefore, the amount of binder material to be added in the process of the invention generally depends on the desired activity of the final catalyst composition. Binder amounts from 0-95 wt. % of the total composition can be suitable, depending on the envisaged catalytic application. However, to take advantage of the resulting unusual high activity of the composition of the present invention, binder amounts to be added are generally in the range of 0.5-75 wt. % of the total composition.

The catalyst composition can be directly shaped. Shaping comprises extrusion, pelletizing, beading, and/or spray drying. It must be noted that if the catalyst composition is to be applied in slurry type reactors, fluidized beds, moving beds, expanded beds, or ebullating beds, spray drying or beading is generally applied for fixed bed applications, although other methods such as extruding, pelletizing and/or beading can be used. In the latter case, prior to or during the shaping step, any additives that are conventionally used to facilitate shaping can be added. These additives may comprise aluminum stearate, surfactants, graphite or mixtures thereof. These additives can be added at any stage prior to the shaping step. Further, when alumina is used as a binder, it may be desirable to add acids prior to the shaping step such as nitric acid to increase the mechanical strength of the extrudates.

It is preferred that a binder material is added prior to the shaping step. Further, it is preferred that the shaping step is carried out in the presence of a liquid, such as water. Preferably, the amount of liquid in the extrusion mixture, expressed as LOI is in the range of 20-80%.

The resulting shaped catalyst composition can, after an optional drying step, be optionally calcined. Calcination however is not essential to the process of the invention. If a calcination is carried out in the process of the invention, it can be done at a temperature of, e.g., from 100° C. to 600° C. and preferably 350° C. to 500° C. for a time varying from 0.5 to 48 hours. The drying of the shaped particles is generally carried out at temperatures above 100° C.

In a preferred embodiment of the invention, the catalyst composition is subjected to spray drying, (flash) drying, milling, kneading, or combinations thereof prior to shaping. These additional process steps can be conducted either before or after a binder is added, after solid-liquid separation, before or after calcination and subsequent to re-wetting. It is believed that by applying any of the above-described techniques of spray drying, (flash) drying, milling, kneading, or combinations thereof, the degree of mixing between the bulk catalyst composition and the binder material is improved. This applies to both cases where the binder material is added before or after the application of any of the above-described methods. However, it is generally preferred to add the binder material prior to spray drying and/or any alternative technique. If the binder is added subsequent to spray drying and/or any alternative technique, the resulting composition is preferably thoroughly mixed by any conventional technique prior to shaping. An advantage of, e.g., spray drying is that no wastewater streams are obtained when this technique is applied.

Furthermore, a cracking component may be added during catalyst preparation. A cracking component in the sense of the present invention is any conventional cracking component such as cationic clays, anionic clays, zeolites such as ZSM-5, (ultra-stable) zeolite Y, zeolite X, ALPO's, SAPO's, amorphous cracking components such as silica-alumina, or mixtures thereof. It will be clear that some materials may act as a binder and a cracking component at the same time. For instance, silica-alumina may have at the same time a cracking and a binding function.

If desired, the cracking component may be composited with a Group VIB metal and/or a Group VIII non-noble metal prior to being composited with the bulk catalyst composition and/or prior to being added during the preparation thereof. Compositing the cracking component with any of these metals may be carried out by impregnation of the cracking component with these materials.

The cracking component, which can comprise about 0-80 wt. %, based on the total weight of the catalyst, can be added at any stage of the process of the present invention prior to the shaping step. However, it is preferred to add the cracking component during the compositing step (ii) with the binder.

Generally, it depends on the envisaged catalytic application of the final catalyst composition which of the above-described cracking components is added. A zeolite is preferably added if the resulting composition shall be applied in hydrocracking or fluid catalytic cracking. Other cracking components such as silica-alumina or cationic clays are preferably added if the final catalyst composition shall be used in hydrotreating applications. The amount of cracking material that is added depends on the desired activity of the final composition and the application envisaged and thus may vary from 0-80 wt. %, based on the total weight of the catalyst composition.

Hydrotreatment Conditions

After slurry hydroconversion, an initial hydrotreatment stage can be used to further reduce the amount of heteroatom contaminants in a slurry hydroconversion product, such as an amount of heteroatom contaminants in the bottoms, atmospheric resid, or vacuum gas oil fraction from the reactor. Hydrotreatment is typically used to reduce the sulfur, nitrogen, and aromatic content of a feed. The catalysts used for hydrotreatment of the heavy portion of the crude oil from the flash separator can include conventional hydroprocessing catalysts, such as those that comprise at least one Group VIII non-noble metal (Columns 8-10 of IUPAC periodic table), preferably Fe, Co, and/or Ni, such as Co and/or Ni; and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 $m^2/g$, or 150 to 250 $m^2/g$; and a pore volume of from 0.25 to 1.0 $cm^3/g$, or 0.35 to 0.8 $cm^3/g$. More generally, any convenient size, shape, and/or pore size distribution for a catalyst suitable for hydrotreatment of a distillate (including lubricant base oil) boiling range feed in a conventional manner may be used. It is within the scope of the present invention that more than one type of hydroprocessing catalyst can be used in one or multiple reaction vessels.

The at least one Group VIII non-noble metal, in oxide form, can typically be present in an amount ranging from about 2 wt % to about 40 wt %, preferably from about 4 wt % to about 15 wt %. The at least one Group VI metal, in oxide form, can typically be present in an amount ranging from about 2 wt % to about 70 wt %, preferably for supported catalysts from about 6 wt % to about 40 wt % or from about 10 wt % to about 30 wt %. These weight percents are based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to in this invention, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. The treat gas stream introduced into a reaction stage will preferably contain at least about 50 vol. % and more to preferably at least about 75 vol. % hydrogen.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.8 MPag); liquid hourly space velocities (LHSV) of 0.1 $hr^{-1}$ to 10 $hr^{-1}$; and hydrogen treat rates of 200 scf/B (35.6 $m^3/m^3$) to 10,000 scf/B (1781 $m^3/m^3$), or 500 (89 $m^3/m^3$) to 10,000 scf/B (1781 $m^3/m^3$).

In some aspects, a hydrotreatment stage can be operated under conditions that are influenced by the conditions in the slurry hydroconversion reactor. For example, the effluent from slurry hydroconversion can be separated using a high pressure separator, operating at roughly the pressure of the slurry hydroconversion reactor, and then passed into the hydrotreatment reactor. In this type of aspect, the pressure in the hydrotreatment reactor can be the same as or similar to the pressure in the slurry hydroconversion reactor. In other aspects, after separation the fuels and gas phase products from the slurry hydroconversion reactor can be passed into a hydrotreatment reactor. This allows hydrogen originally passed into the slurry hydroconversion reactor to be used as the hydrogen source for hydrotreatment.

Hydrocracking Conditions

Additionally or alternately, the bottoms, atmospheric resid, or vacuum gas oil portion from the slurry hydroconversion reactor can be hydrocracked to further upgrade the vacuum gas oil portion. In various aspects, the reaction conditions in the reaction system can be selected to generate a desired level of conversion of a feed. Conversion of the feed can be defined in terms of conversion of molecules that boil above a temperature threshold to molecules below that threshold. The conversion temperature can be any convenient temperature, such as about 700° F. (371° C.). In an aspect, the amount of conversion in the stage(s) of the reaction system can be selected to enhance diesel production while achieving a substantial overall yield of fuels. The amount of conversion can correspond to the total conversion of molecules within any stage of the fuels hydrocracker or other reaction system that is used to hydroprocess the lower boiling portion of the feed from the vacuum distillation unit. Suitable amounts of conversion of to molecules boiling above 700° F. to molecules boiling below 700° F. include converting at least 10% of the 700° F.+ portion of the feedstock to the stage(s) of the reaction system, such as at least 20% of the 700° F.+ portion, or at least 30%. Additionally or alternately, the amount of conversion for the reaction system can be about 85% or less, or about 70% or less, or about 55% or less, or about 40% or less. Still larger amounts of conversion may also produce a suitable hydrocracker bottoms for forming lubricant base oils, but such higher conversion amounts will also result in a reduced yield of lubricant base oils. Reducing the amount of conversion can increase the yield of lubricant base oils, but reducing the amount of conversion to below the ranges noted above may result in hydrocracker bottoms that are not suitable for formation of Group II, Group II+, or Group III lubricant base oils.

In order to achieve a desired level of conversion, a reaction system can include at least one hydrocracking catalyst. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophosphates. One example of suitable zeolite is USY, such as a USY zeolite with cell size of 24.30 Angstroms or less. Additionally or alternately, the catalyst can be a low acidity molecular sieve, such as a USY zeolite with a Si to Al ratio of at least about 20, and preferably at least about 40 or 50. ZSM-48, such as ZSM-48 with a $SiO_2$ to $Al_2O_3$ ratio of about 110 or less, such as about 90 or less, is another example of a potentially suitable hydrocracking catalyst. Still another option is to use a combination of USY and ZSM-48. Still other options include using one or more of zeolite Beta, ZSM-5, ZSM-35, or ZSM-23, either alone or in combination with a USY catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

In various aspects, the conditions selected for hydrocracking for fuels hydrocracking and/or lubricant base stock production can depend on the desired level of conversion, the level of contaminants in the input feed to the hydrocracking stage, and potentially other factors. For example, hydrocracking conditions in a single stage, or in the first stage and/or the second stage of a multi-stage system, can be selected to achieve a desired level of conversion in the reaction system. Hydrocracking conditions can be referred to as sour conditions or sweet conditions, depending on the level of sulfur and/or nitrogen present within a feed. For example, a feed with 100 wppm or less of sulfur and 50 wppm or less of nitrogen, preferably less than 25 wppm sulfur and/or less than 10 wppm of nitrogen, represent a feed for hydrocracking under sweet conditions. Preferably, a slurry hydroconversion effluent that has also been hydrotreated can have a sufficiently low content of sulfur and/or nitrogen for hydrocracking under sweet conditions.

A hydrocracking process under sour conditions can be carried out at temperatures of about 550° F. (288° C.) to about 840° F. (449° C.), hydrogen partial pressures of from about 250 psig to about 5000 psig (1.8 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of about 600° F. (343° C.) to about 815° F. (435° C.), hydrogen partial pressures of from about 500 psig to about 3000 psig (3.5 MPag-20.9 MPag), and hydrogen treat gas rates of from about 213 $m^3/m^3$ to about 1068 $m^3/m^3$ (1200 SCF/B to 6000 SCF/B). The LHSV relative to only the hydrocracking catalyst can be from about 0.25 $h^{-1}$ to about 50 $h^{-1}$, such as from about 0.5 h$^{-1}$ to about 20 h$^{-1}$, and preferably from about 1.0 h$^{-1}$ to about 4.0 h$^{-1}$ In some aspects, a portion of the hydrocracking catalyst and/or the dewaxing catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as about 350° F. (177° C.) or about 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least about 350° F. (177° C.) or at least about 400° F. (204° C.) to having an upper end cut point temperature of about 700° F. (371° C.) or less or 650° F. (343° C.) or less. Optionally, the distillate fuel range can be extended to include additional kerosene, such as by selecting a lower end cut point temperature of at least about 300° F. (149° C.).

In aspects where the inter-stage separator is also used to produce a distillate fuel fraction, the portion boiling below the distillate fuel fraction includes, naphtha boiling range molecules, light ends, and contaminants such as H$_2$S. These different products can be separated from each other in any convenient manner. Similarly, one or more distillate fuel fractions can be formed, if desired, from the distillate boiling range fraction. The portion boiling above the distillate fuel range represents the potential lubricant base oils. In such aspects, the portion boiling above the distillate fuel range is subjected to further hydroprocessing in a second hydroprocessing stage.

A hydrocracking process under sweet conditions can be performed under conditions similar to those used for a sour hydrocracking process, or the conditions can be different. In an embodiment, the conditions in a sweet hydrocracking stage can have less severe conditions than a hydrocracking process in a sour stage. Suitable hydrocracking conditions for a non-sour stage can include, but are not limited to, conditions similar to a first or sour stage. Suitable hydrocracking conditions can include temperatures of about 550° F. (288° C.) to about 840° F. (449° C.), hydrogen partial pressures of from about 250 psig to about 5000 psig (1.8 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of about 600° F. (343° C.) to about 815° F. (435° C.), hydrogen partial pressures of from about 500 psig to about 3000 psig (3.5 MPag-20.9 MPag), and hydrogen treat gas rates of from about 213 m$^3$/m$^3$ to about 1068 m$^3$/m$^3$ (1200 SCF/B to 6000 SCF/B). The liquid hourly space velocity can vary depending on the relative amount of hydrocracking catalyst used versus dewaxing catalyst. Relative to the combined amount of hydrocracking and dewaxing catalyst, the LHSV can be from about 0.2 h$^{-1}$ to about 10 h$^{-1}$, such as from about 0.5 h$^{-1}$ to about 5 h$^{-1}$ and/or from about 1 h$^{-1}$ to about 4 h$^{-1}$. Depending on the relative amount of hydrocracking catalyst and dewaxing catalyst used, the LHSV relative to only the hydrocracking catalyst can be from about 0.25 h$^{-1}$ to about 50 h$^{-1}$, such as from about 0.5 h$^{-1}$ to about 20 h$^{-1}$, and preferably from about 1.0 h$^{-1}$ to about 4.0 h$^{-1}$.

In still another embodiment, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

Additional Embodiments

Embodiment 1. A method for processing a heavy oil feedstock, comprising: providing a heavy oil feedstock having a 10% distillation point of at least about 650° F. (343° C.) and a first Conradson carbon residue wt %; exposing the heavy oil feedstock to a slurry hydroconversion catalyst in one or more reactors under effective slurry hydroconversion conditions to form a slurry hydroconversion effluent, the effective slurry hydroconversion conditions being effective for conversion of at least about 80 wt % of the second heavy oil feedstock relative to a conversion temperature of 1050° F. (566° C.), such as at least about 90 wt %; separating a bottoms product from the slurry hydroconversion effluent, the bottoms product having a 10% distillation point of at least about 650° F. (343° C.); and hydrocracking at least a portion of the bottoms product in the presence of a hydrocracking catalyst under effective hydrocracking conditions, the at least a portion of the bottoms product having a final boiling point of at least about 1050° F. (566° C.), wherein the slurry hydroconversion catalyst comprises a bulk multimetallic catalyst comprising at least one non-noble Group VIII (Group 8-10) metal and at least one Group VIB (Group 6) metal, a weight of the slurry hydroconversion catalyst being about 2 wt % to 25 wt % of a weight of the heavy oil feedstock in the reactor.

Embodiment 2. The method of claim 1, wherein the bottoms product has a nitrogen content of about 500 wppm or less.

Embodiment 3. The method of any of the above embodiments, wherein the bottoms product is separated from the slurry hydroconversion effluent without formation of a slurry hydroconversion pitch.

Embodiment 4. The method of any of the above embodiments, wherein the bulk multimetallic catalyst has an average particle size of about 40 μm to about 100 μm, or about 40 μm to about 90 μm, or about 50 μm to about 100 μm, or about 50 μm to about 90 μm.

Embodiment 5. The method of any of the above claims, wherein the heavy oil feedstock comprises about 5 vol % to about 50 vol % of catalyst slurry oil, a weight of fluid catalytic cracking catalyst fines comprising about 1 wt % to about 5 wt % of the heavy oil feedstock in the reactor, the slurry hydroconversion catalyst comprising about 2 wt % to about 20 wt % of the heavy oil feedstock in the reactor.

Embodiment 6. The method of any of Embodiments 1-4, wherein the slurry hydroconversion catalyst further comprises a demetallization catalyst, a weight of the demetallization catalyst comprising about 5% to 50% of a total catalyst weight in the reactor, the total catalyst weight being about 2 wt % to about 25 wt % of the weight of the heavy oil feedstock in the reactor.

Embodiment 7. The method of Embodiment 6, wherein the demetallization catalyst has an average particle size of at least about 100 μm, or at least about 150 μm, and/or about 100 μm to about 500 μm.

Embodiment 8. The method of any of the above embodiments, wherein the slurry hydroconversion effluent comprises entrained slurry hydroconversion catalyst, the method further comprising separating the entrained slurry hydroconversion catalyst from the plurality of liquid products, and recycling at least a portion of the separated slurry hydroconversion catalyst to the reactor.

Embodiment 9. The method of any of the above embodiments, wherein the heavy oil feedstock is exposed to the slurry hydrotreating catalyst in a plurality of reactors.

Embodiment 10. The method of any of the above embodiments, wherein exposing the heavy oil feedstock to a catalyst under effective slurry hydroconversion conditions to form a slurry hydroconversion effluent comprises: exposing the heavy oil feedstock to a first catalyst under first effective slurry hydroconversion conditions to form a first slurry hydroconversion effluent; and exposing at least a portion of the first slurry hydroconversion effluent to a second catalyst under second effective slurry hydroconversion conditions to form a second slurry hydroconversion effluent, the bottoms product comprising at least a portion of the second slurry hydroconversion effluent.

Embodiment 11. The method of Embodiment 10, wherein a temperature of the second effective slurry hydroconversion conditions is greater than a temperature of the first effective slurry hydroconversion conditions by at least about 10° C., or at least about 20° C., and/or about 80° C. or less, or about 50° C. or less, or any combination thereof.

Embodiment 12. The method of Embodiment 10 or 11, further comprising fractionating the first slurry hydroconversion effluent to form at least one of a naphtha fraction or a distillate fuel fraction, and at least one slurry bottoms fraction, the slurry bottoms fraction containing a portion of the first catalyst corresponding to at least about 50% of the first catalyst in the first slurry hydroconversion effluent, wherein exposing at least a portion of the first slurry hydroconversion effluent to the second catalyst comprises exposing at least a portion of the slurry bottoms fraction to the second catalyst.

Embodiment 13. The method of Embodiment 12, wherein the second catalyst comprises the portion of the first catalyst contained in the slurry resid or bottoms fraction.

Embodiment 14. The method of Embodiment 13, further comprising separating the slurry resid or bottoms fraction to form a first catalyst fraction and a catalyst-depleted resid or bottoms fraction, the catalyst-depleted resid or bottoms fraction containing about 25 wt % or less of the catalyst in the slurry resid or bottoms fraction prior to separation, wherein exposing at least a portion of the slurry resid or bottoms fraction to the second catalyst comprises exposing at least a portion of the catalyst-depleted resid or bottoms fraction to the second catalyst.

Embodiment 15. The method of Embodiment 14, further comprising introducing the second catalyst into the catalyst-depleted resid or bottoms fraction.

Embodiment 16. The method of any of Embodiments 12-15, wherein the first slurry hydroconversion effluent is fractionated in a divided wall fractionator, the method further comprising fractionating the second slurry hydroconversion effluent in the divided wall fractionator.

Embodiment 17. The method of any of the above embodiments, wherein the slurry hydroconversion catalyst comprises a bulk multimetallic catalyst comprising at least one non-noble Group VIII metal and at least two Group VIB metals, a ratio of the non-noble Group VIII metal to the Group VIB metals being from about 10:1 to about 1:10.

Embodiment 18. The method of Embodiment 17, wherein the bulk multimetallic catalyst is represented by the formula $(X)_b(Mo)_c(W)_dO_z$, wherein X is a Group VIII non-noble metal, the Group VII non-noble metal preferably being at least one of Ni and Co.

Embodiment 19. The method of Embodiment 17 or 18, wherein a ratio of b:(c+d) is from 0.5:1 to 3:1, preferably 0.75:1 to 1.5:1.

Embodiment 20. The method of any of the above embodiments, wherein the bulk catalyst is formed from a catalyst precursor that comprises at least one metal from Group 6 of the Periodic Table of the Elements, at least one metal from Groups 8-10 of the Periodic Table of the Elements, and a reaction product formed from (i) a first organic compound containing at least one amine group and at least 10 carbons or (ii) a second organic compound containing at least one carboxylic acid group and at least 10 carbons, but not both (i) and (ii), wherein the reaction product contains additional unsaturated carbon atoms, relative to (i) the first organic compound or (ii) the second organic compound, wherein the metals of the catalyst precursor composition are arranged in a crystal lattice, and wherein the reaction product is not located within the crystal lattice.

Embodiment 21. The method of Embodiment 20, wherein said at least one metal from Group 6 is Mo, W, or a combination thereof, and wherein said at least one metal from Groups 8-10 is Co, Ni, or a combination thereof.

Embodiment 22. The method of Embodiment 20 or 21, wherein said catalyst precursor composition further comprises at least one metal from Group 5 of the Periodic Table of the Elements, for example V, Nb, or a combination thereof.

Embodiment 23. The method of any of Embodiments 20-22, wherein said first organic compound comprises a primary monoamine having from 10 to 30 carbon atoms, and/or wherein said second organic compound comprises only one carboxylic acid group and has from 10 to 30 carbon atoms.

Embodiment 24. The method of any of Embodiments 20-23, further comprising heating the catalyst precursor to a temperature from about 195° C. to about 250° C. for a time sufficient for the first or second organic compounds to form a reaction product in situ that contains unsaturated carbon atoms not present in the first or second organic compounds.

What is claimed is:
1. A method for processing a heavy oil feedstock, comprising:
providing a heavy oil feedstock having a 10 wt % distillation point of at least about 650° F. (343° C.) and a first Conradson carbon residue wt %;

exposing the heavy oil feedstock to a slurry hydroconversion catalyst in one or more reactors under effective slurry hydroconversion conditions to form a slurry hydroconversion effluent, the effective slurry hydroconversion conditions being effective for conversion of at least about 80 wt % of the heavy oil feedstock relative to a conversion temperature of 1050° F. (566° C.);

separating a bottoms product from the slurry hydroconversion effluent, the bottoms product having a 10 wt % distillation point of at least about 650° F. (343° C.); and hydrocracking at least a portion of the bottoms product in the presence of a hydrocracking catalyst under effective hydrocracking conditions, the at least a portion of the bottoms product having a final boiling point of at least about 1050° F. (566° C.), wherein the slurry hydroconversion catalyst comprises a bulk multimetallic catalyst comprising at least one non-noble Group VIII (Group 8-10) metal and at least one Group VIB (Group 6) metal, a weight of the slurry hydroconversion catalyst being about 2 wt % to 25 wt % of a weight of the heavy oil feedstock in the reactor, and wherein the bulk catalyst is formed from a catalyst precursor that comprises at least one metal from Group 6 of the Periodic Table of the Elements, at least one metal from Groups 8-10 of the Periodic Table of the Elements, and a reaction product formed from (i) a first organic compound containing at least one amine group and at least 10 carbons or (ii) a second organic compound containing at least one carboxylic acid group and at least 10 carbons, but not both (i) and (ii), wherein the reaction product contains additional unsaturated carbon atoms, relative to (i) the first organic compound or (ii) the second organic compound, wherein the metals of the catalyst precursor composition are arranged in a crystal lattice, and wherein the reaction product is not located within the crystal lattice.

2. The method of claim 1, wherein the bottoms product has a nitrogen content of about 500 wppm or less.

3. The method of claim 1, wherein the bottoms product is separated from the slurry hydroconversion effluent without formation of a slurry hydroconversion pitch.

4. The method of claim 1, wherein the bulk multimetallic catalyst has an average particle size of about 40 μm to about 100 μm.

5. The method of claim 1, wherein the heavy oil feedstock comprises about 5 vol % to about 50 vol % of catalyst slurry oil, a weight of fluid catalytic cracking catalyst fines comprising about 1 wt % to about 5 wt % of the heavy oil feedstock in the reactor, the slurry hydroconversion catalyst comprising about 2 wt % to about 20 wt % of the heavy oil feedstock in the reactor.

6. The method of claim 1, wherein the slurry hydroconversion catalyst further comprises a demetallization catalyst, a weight of the demetallization catalyst comprising about 5% to 50% of a total catalyst weight in the reactor, the total catalyst weight being about 2 wt % to about 25 wt % of the weight of the heavy oil feedstock in the reactor.

7. The method of claim 6, wherein the demetallization catalyst has an average particle size of at least about 100 μm.

8. The method of claim 1, wherein the slurry hydroconversion effluent comprises entrained slurry hydroconversion catalyst, and wherein the separating of the bottoms product also includes fractionating a plurality of liquid and gaseous products, the method further comprising separating the entrained slurry hydroconversion catalyst from the plurality of liquid products, and recycling at least a portion of the separated slurry hydroconversion catalyst to the reactor.

9. The method of claim 1, wherein the heavy oil feedstock is exposed to the slurry hydroconversion catalyst in a plurality of reactors.

10. The method of claim 1, wherein exposing the heavy oil feedstock to a catalyst under effective slurry hydroconversion conditions to form a slurry hydroconversion effluent comprises:

exposing the heavy oil feedstock to a first catalyst under first effective slurry hydroconversion conditions to form a first slurry hydroconversion effluent; and exposing at least a portion of the first slurry hydroconversion effluent to a second catalyst under second effective slurry hydroconversion conditions to form a second slurry hydroconversion effluent, the bottoms product comprising at least a portion of the second slurry hydroconversion effluent.

11. The method of claim 10, wherein a temperature of the second effective slurry hydroconversion conditions is greater than a temperature of the first effective slurry hydroconversion conditions by about 10° C. to about 80° C.

12. The method of claim 10, further comprising fractionating the first slurry hydroconversion effluent to form at least one of a naphtha fraction or a distillate fuel fraction, and at least one slurry bottoms fraction, the slurry bottoms fraction containing a portion of the first catalyst corresponding to at least about 50 wt % of the first catalyst in the first slurry hydroconversion effluent, wherein exposing at least a portion of the first slurry hydroconversion effluent to the second catalyst comprises exposing at least a portion of the slurry bottoms fraction to the second catalyst.

13. The method of claim 1, wherein the slurry hydroconversion catalyst comprises a bulk multimetallic catalyst comprising at least one non-noble Group VIII metal and at least two Group VIB metals, a ratio of the non-noble Group VIII metal to the Group VIB metals being from about 10:1 to about 1:10.

14. The method of claim 13, wherein the bulk multimetallic catalyst is represented by the formula

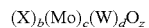

wherein X is a Group VIII non-noble metal.

15. The method of claim 14, wherein a ratio of b:(c+d) is from 0.5:1 to 3:1.

16. The method of claim 1, wherein said at least one metal from Group 6 is Mo, W, or a combination thereof, and wherein said at least one metal from Groups 8-10 is Co, Ni, or a combination thereof.

17. The method of claim 16, wherein said catalyst precursor composition further comprises at least one metal from Group 5 of the Periodic Table of the Elements, for example V, Nb, or a combination thereof.

18. The method of claim 1, wherein said first organic compound comprises a primary monoamine having from 10 to 30 carbon atoms, and/or wherein said second organic compound comprises only one carboxylic acid group and has from 10 to 30 carbon atoms.

19. The method of claim 1, further comprising heating the catalyst precursor to a temperature from about 195° C. to about 250° C. for a time sufficient for the first or second organic compounds to form a reaction product in situ that contains unsaturated carbon atoms not present in the first or second organic compounds.

* * * * *